(12) United States Patent
Ishii et al.

(10) Patent No.: US 12,526,378 B2
(45) Date of Patent: Jan. 13, 2026

(54) INFORMATION PROCESSING APPARATUS, INFORMATION PROCESSING SYSTEM, AND NON-TRANSITORY RECORDING MEDIUM FOR MANAGING LICENSE INFORMATION

(71) Applicants: Tatsuya Ishii, Kanagawa (JP); Yoshio Konno, Kanagawa (JP); Mitsutaka Nakata, Tokyo (JP)

(72) Inventors: Tatsuya Ishii, Kanagawa (JP); Yoshio Konno, Kanagawa (JP); Mitsutaka Nakata, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/416,928

(22) Filed: Jan. 19, 2024

(65) Prior Publication Data

US 2024/0267477 A1    Aug. 8, 2024

(30) Foreign Application Priority Data

Feb. 3, 2023   (JP) .................................. 2023-015111

(51) Int. Cl.
*H04N 1/44*    (2006.01)

(52) U.S. Cl.
CPC ......... *H04N 1/4433* (2013.01); *H04N 1/4426* (2013.01)

(58) Field of Classification Search
CPC ............................. H04N 1/4433; H04N 1/4426
See application file for complete search history.

(56) References Cited

U.S. PATENT DOCUMENTS

| | | | |
|---|---|---|---|
| 2010/0161837 A1* | 6/2010 | Miyajima | H04N 1/00973 710/8 |
| 2010/0302582 A1* | 12/2010 | Yoshimura | H04N 1/4406 358/1.15 |
| 2011/0273737 A1* | 11/2011 | Hirao | H04N 1/00344 358/1.14 |
| 2014/0211218 A1* | 7/2014 | Yuki | G06F 21/121 358/1.5 |
| 2014/0211219 A1* | 7/2014 | Yabe | H04N 1/4433 358/1.5 |
| 2017/0251122 A1* | 8/2017 | Matsushima | H04N 1/4433 |
| 2018/0089413 A1* | 3/2018 | Fukuhara | G06F 21/629 |
| 2018/0097958 A1* | 4/2018 | Onsen | H04N 1/00938 |
| 2018/0115678 A1* | 4/2018 | Takahashi | H04N 1/00652 |
| 2020/0042673 A1* | 2/2020 | Kidokoro | G06F 21/105 |
| 2020/0106907 A1 | 4/2020 | Hirano et al. | |

(Continued)

FOREIGN PATENT DOCUMENTS

| | | |
|---|---|---|
| JP | 2006-163924 A | 6/2006 |
| JP | 2006-277527 A | 10/2006 |
| JP | 2014-153078 A | 8/2014 |

*Primary Examiner* — Nicholas Pachol
(74) *Attorney, Agent, or Firm* — XSENSUS LLP

(57) ABSTRACT

An information processing apparatus includes processing circuitry to acquire license information indicating a license of a predetermined function, and execute a process related to the predetermined function permitted by the license. In a case where a state of the license information being acquired changes to a state of not acquired during execution of the process, the processing circuitry restricts the execution of the process related to the predetermined function.

8 Claims, 22 Drawing Sheets

(56) References Cited

U.S. PATENT DOCUMENTS

| | | |
|---|---|---|
| 2021/0029269 A1* | 1/2021 | Nakamura .......... H04L 63/0823 |
| 2021/0080888 A1 | 3/2021 | Ishii et al. |
| 2021/0097357 A1 | 4/2021 | Katoh et al. |
| 2021/0105382 A1* | 4/2021 | Matsuo ................ H04L 63/108 |
| 2021/0150113 A1 | 5/2021 | Shibata et al. |
| 2021/0163247 A1 | 6/2021 | Suzuki et al. |
| 2021/0218860 A1 | 7/2021 | Nikaku et al. |
| 2021/0266423 A1 | 8/2021 | Ishii et al. |
| 2022/0109776 A1 | 4/2022 | Ishii et al. |
| 2022/0109780 A1 | 4/2022 | Suzuki et al. |
| 2022/0219932 A1 | 7/2022 | Yamazaki et al. |
| 2022/0263963 A1 | 8/2022 | Aoyagi et al. |
| 2022/0263972 A1 | 8/2022 | Kaima et al. |
| 2022/0286572 A1 | 9/2022 | Nakayama et al. |
| 2022/0286576 A1 | 9/2022 | Ishitsuka et al. |
| 2022/0291618 A1 | 9/2022 | Yamazaki et al. |
| 2022/0318582 A1 | 10/2022 | Ishii et al. |
| 2022/0321708 A1 | 10/2022 | Matsumoto et al. |
| 2023/0010640 A1 | 1/2023 | Konno et al. |
| 2023/0113044 A1 | 4/2023 | Suzuki et al. |
| 2023/0262184 A1* | 8/2023 | Naito ................ H04N 1/00344 358/1.13 |
| 2023/0401405 A1 | 12/2023 | Suzuki et al. |
| 2024/0054189 A1* | 2/2024 | Naito .................... G06F 21/107 |
| 2024/0422269 A1* | 12/2024 | Lee .................... H04N 1/00204 |

* cited by examiner

FIG. 5

USABLE FUNCTION MANAGEMENT TABLE

| FUNCTION ID | USABLE FUNCTION |
|---|---|
| F0001 | MONOCHROME/COLOR SWITCHING |
| F0002 | ENABLE/DISABLE SWITCHING OF SPECIAL COLOR |
| F0003 | ENABLE/DISABLE SWITCHING OF AUTOMATIC ALIGNMENT FUNCTION |
| F0004 | PERIPHERAL DEVICE CONFIGURATION |
| ... | ... |

INFORMATION PROCESSING APPARATUS, INFORMATION PROCESSING SYSTEM, AND NON-TRANSITORY RECORDING MEDIUM FOR MANAGING LICENSE INFORMATION

CROSS-REFERENCE TO RELATED APPLICATION

This patent application is based on and claims priority pursuant to 35 U.S.C. § 119(a) to Japanese Patent Application No. 2023-015111, filed on Feb. 3, 2023, in the Japan Patent Office, the entire disclosure of which is hereby incorporated by reference herein.

BACKGROUND

Technical Field

Embodiments of the present disclosure relate to an information processing apparatus, an information processing system, and a non-transitory recording medium.

Related Art

A related-art technology individually enables or disables functions of, for example, a multifunction peripheral having various functions. For enabling or disabling functions, a dedicated license authentication tool called a dongle is known.

For example, there is a known technology for an information processing apparatus to manage one license per one connected image processing apparatus and manage the license by grasping the number of connected image processing apparatuses. In the technology, when a setting tool is activated on a laptop personal computer (PC), the setting tool attempts communication with a dongle to check whether a dongle is attached. In a case where it is determined that there is no dongle, a setting operation that does not require the dongle is executed. In a case where it is determined that there is the dongle, initialization communication is performed with a setting module of the information processing apparatus, and a serial number unique to the information processing apparatus is read via the setting module.

SUMMARY

In one aspect, an information processing apparatus includes processing circuitry to acquire license information indicating a license of a predetermined function, and execute a process related to the predetermined function permitted by the license. In a case where a state of the license information being acquired changes to a state of not acquired during execution of the process, the processing circuitry restricts the execution of the process related to the predetermined function.

In another aspect, an information processing system includes an information processing apparatus and a communication terminal. The communication terminal includes first processing circuitry to acquire license information indicating a license of a predetermined function. In a case that communication with the information processing apparatus is established and the license information is not acquired, the first processing circuitry causes a display to display a notification indicating that execution of a process related to the predetermined function is restricted, and transmits the notification via a network to the information processing apparatus. The information processing apparatus includes an interface to receive the notification from the communication terminal, and second processing circuitry. The second processing circuitry executes a process related to the predetermined function permitted by the license, and restricts execution of the process related to the predetermined function in response to reception of the notification via the interface during the execution of the process related to the predetermined function.

In another aspect, a non-transitory recording medium stores a plurality of program codes which, when executed by one or more processors, causes the one or more processors to perform a method. The method includes acquiring license information indicating a license of a predetermined function; executing a process related to the predetermined function permitted by the license; and, in a case where a state of the license information being acquired changes to a state of not acquired during execution of the process, restricting the execution of the process related to the predetermined function.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 5 is a conceptual diagram illustrating a usable function management table according to embodiments of the present disclosure;

Figure 1:
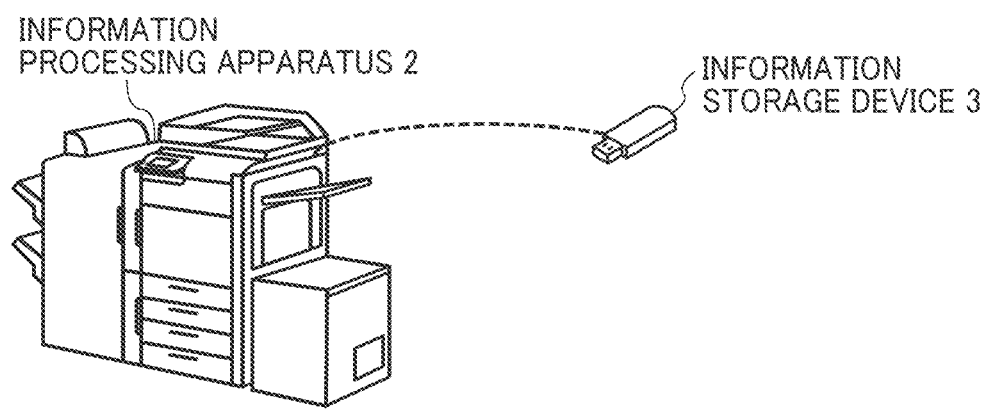
FIG. 1 is a diagram illustrating an information processing apparatus and an information storage device according to a first embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION OF EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure will be described below with reference to the drawings. In the description of the drawings, the same components are denoted by like reference signs, and redundant descriptions thereof are omitted.

First Embodiment

Information Processing Apparatus and Information Storage Device

FIG. 1 is a diagram illustrating an information processing apparatus and an information storage device according to a first embodiment.

Information Processing Apparatus

As illustrated in FIG. 1, an information processing apparatus 2 is, for example, a multifunction peripheral (MFP) equipped with a plurality of functions. The information processing apparatus 2 includes an interface (I/F) for connecting a dongle or a protect dongle that is a small device connectable to a computer. The above-described interface is, for example, a universal serial bus (USB) interface. When an information storage device 3 is connected to the USB interface, the information processing apparatus 2 can acquire license information from the information storage device 3.

The information processing apparatus 2 can collectively manage various pieces of data (information) of the information storage device 3. In other words, the information processing apparatus 2 may function as an apparatus that collectively manages a data table and various pieces of image data managed by the information storage device 3.

As described above, in the present embodiment, the MFP will be described as an example of the information processing apparatus 2. However, the information processing apparatus 2 is not limited thereto but may be any apparatus that executes a process related to a predetermined function (a process related to a predetermined function) on the basis of a license acquired from the information storage device 3 (dongle) for checking whether software is used under an authorized license, connected to the information processing apparatus. In other words, the information processing apparatus 2 may be commonly used electronic whiteboard, projector, tablet communication terminal, or game console.

Information Storage Device

As illustrated in FIG. 1, the information storage device 3 is, for example, a small device (USB device) connected to a connector such as a USB interface provided on the information processing apparatus 2. The information storage device 3 (dongle) is a license authentication tool used for checking whether usage is under the authorized license (for the purpose of a kind of copy guard), and in the present embodiment, the information storage device 3 is sometimes referred to as the "dongle". Note that, the dongle may be a medium of another form such as a secure digital (SD) memory card as long as this is a physical medium.

As described above, according to the present embodiment, even when the acquisition state of the license information that enables execution of a process related to a predetermined function has changed during the process as in the related art, the information processing apparatus or the information processing system enables a process in accordance with the change.

Hardware Configurations

Hardware configurations of a communication terminal or an apparatus forming the information processing system according to the present embodiment will be described with reference to FIGS. 2 and 3. In the hardware configurations of the apparatus and the device illustrated in FIGS. 2 and 3, a component may be added or deleted as appropriate.

Hardware Configuration of Information Processing Apparatus

Figure 2:
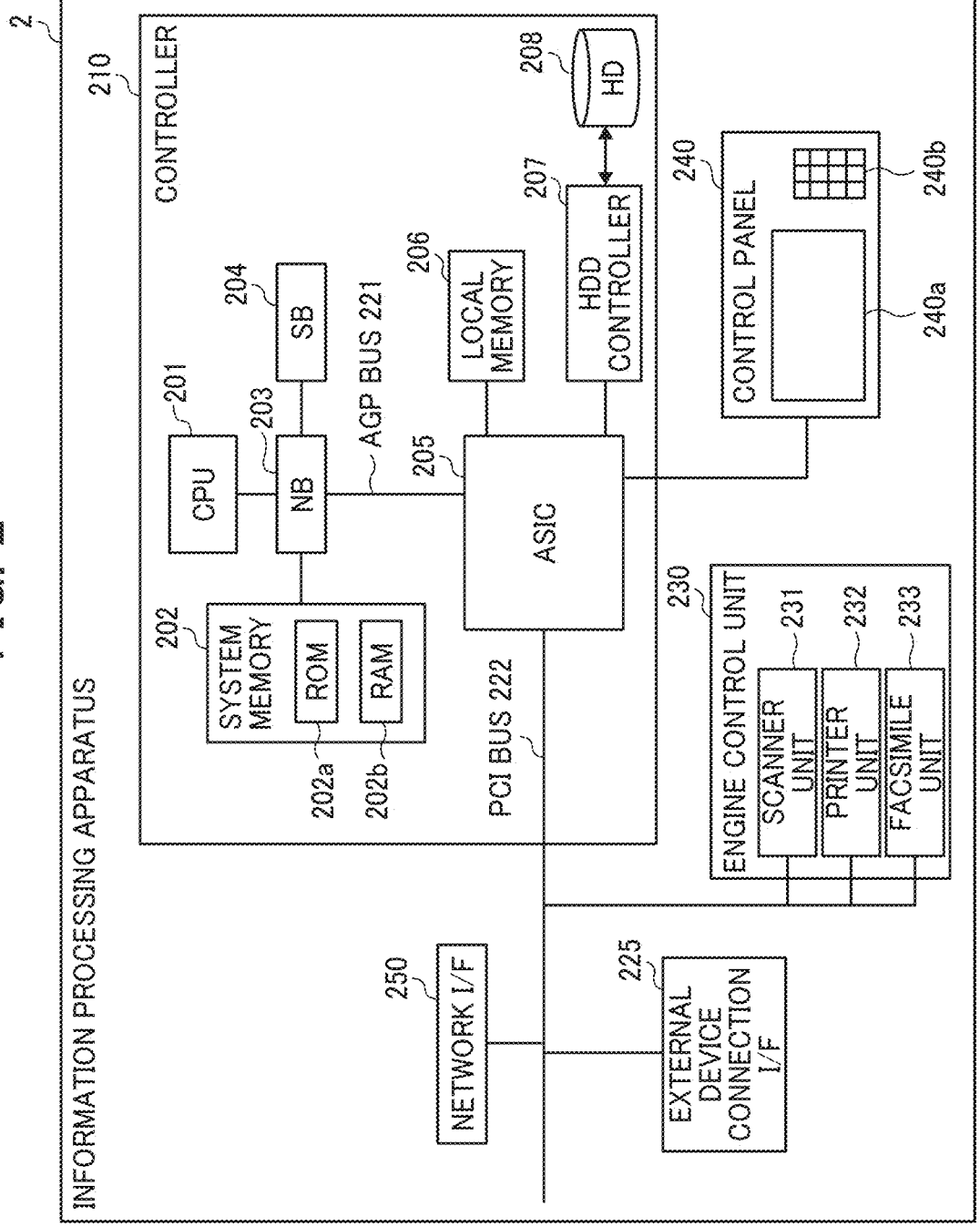
FIG. 2 is a diagram illustrating a hardware configuration of an information processing apparatus according to embodiments of the present disclosure.

FIG. 2 is a diagram illustrating an example of the hardware configuration of the information processing apparatus according to the present embodiment. The information processing apparatus 2 is constructed by a computer, and is, for example, the MFP. As illustrated in FIG. 2, the information processing apparatus 2 includes hardware resources including a controller 210, an external device connection I/F 225, an engine control unit 230, a control panel 240, and a network I/F 250.

Among them, the controller 210 includes a central processing unit (CPU) 201 as a main processor of the computer, a system memory 202, a north bridge (NB) 203, a south bridge (SB) 204, an application specific integrated circuit (ASIC) 205, a local memory 206 as a storage unit, a hard disk drive (HDD) controller 207, and a hard disk (HD) 208 as a storage unit. The NB 203 and the ASIC 205 are connected to each other through an accelerated graphics port (AGP) bus 221.

Among them, the CPU 201 is a control unit that controls an entire information processing apparatus 2. The NB 203 is a bridge to connect the CPU 201 to the system memory 202, the SB 204, and an AGP bus 221, and includes a memory controller that controls the reading/writing from/to the system memory 202, a peripheral component interconnect (PCI) master, and an AGP target.

The system memory 202 includes a read-only memory (ROM) 202a, which is a memory for storing a program and data for implementing functions of the controller 210, and a random-access memory (RAM) 202b that deploys the program and data, or used as a memory for loading drawing data in printing. The program stored in the RAM 202b may be provided as a file in a format installable or executable, recorded on a computer-readable recording medium such as a compact disc read only memory (CD-ROM), compact disc-recordable (CD-R), or digital versatile disk (DVD).

The SB 204 is a bridge to connect the NB 203 to a PCI device and a peripheral device. The ASIC 205 is an integrated circuit (IC) for image processing applications including hardware elements for image processing and has a role of a bridge connecting the AGP bus 221, a PCI bus 222, the HD 208, and the local memory 206 to one another. The ASIC 205 includes a PCI target, an AGP master, an arbiter that arbitrates the time of driving of individual signals according to a predetermined priority in the ASIC 205, a memory controller that controls the local memory 206, a plurality of direct memory access controllers (DMACs) that rotates image data by a hardware logic, and a PCI unit that transfers data between a scanner unit 231 and a printer unit 232 to be described later via the PCI bus 222. A USB interface or an interface of Institute of Electrical and Electronics Engineers 1394 (IEEE 1394) may be connected to the ASIC 205.

The local memory 206 is a local memory used as a buffer for image to be copied or a code buffer. The HD 208 is a storage that stores image data, font data used in printing, and a form. The HD 208 controls the reading or writing of data from or to the HD 208 under the control of the CPU 201. The AGP bus 221 is a bus interface for a graphics accelerator card proposed to accelerate graphics processing, and can speed up the graphics accelerator card by directly accessing the system memory 202 at high throughput.

The external device connection I/F 225 is an interface for connecting to the information storage device 3, and is, for example, a USB interface.

The information processing apparatus 2 may include a short-range communication circuit including a short-range communication circuit antenna. The short-range communication circuit is a communication circuit in compliance with, for example, the near field communication (NFC), BLUETOOTH, or WIRELESS FIDELITY (WI-FI).

The engine control unit 230 includes the scanner unit 231, the printer unit 232, and a facsimile unit 233. The control panel 240 includes a panel display 240a such as a touch panel that displays current setting values or a selection screen and receives input from an operator, and an operation key 240b including a numeric keypad that receives setting values of conditions related to image formation such as density set condition, and a start key that receives an instruction to start copying. The panel display 240a is an example of a display means in the present embodiment. The controller 210 controls an entire information processing apparatus 2. For example, the controller 210 controls drawing, communication, or inputs from the control panel 240. The scanner unit 231 and the printer unit 232 have capabilities of image processing such as error diffusion and gamma ($\gamma$) conversion. The facsimile unit 233 includes an analog I/F for performing facsimile communication using an analog line (public line) connected to an external device, a modem (MODEM), and a speaker.

The information processing apparatus 2 can sequentially switch to select a document box function, a copying function, a printing function, and a facsimile function by an application switch key of the control panel 240. When the document box function is selected, a mode switches to a document box mode, when the copying function is selected, the mode switches to a copy mode, when the printer function is selected, the mode switches to a printer mode, and when the facsimile mode is selected, the mode switches to a facsimile mode.

The network I/F 250 is an interface for performing data communication through a communication network 100. The external device connection I/F 225 and the network I/F 250 are electrically connected to the ASIC 205 via the PCI bus 222. The information processing apparatus 2 is not limited to the above-described MFP as long as this is an apparatus or a communication terminal that may acquire the license information of the information processing apparatus 2 itself from the information storage device 3 to be described later and operating predetermined software.

Hardware Configuration of Information Storage Device

Figure 3:
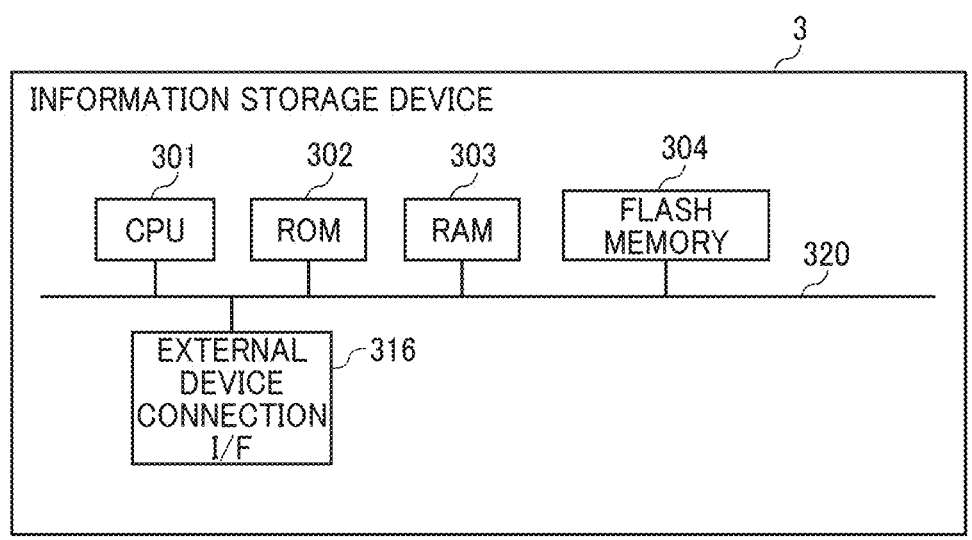
FIG. 3 is a diagram illustrating a hardware configuration of an information storage device according to embodiments of the present disclosure.

FIG. 3 is a diagram illustrating an example of a hardware configuration of the information storage device according to the present embodiment. As described above, the information storage device 3 is a small device connectable to the computer. As illustrated in FIG. 3, the information storage device 3 includes a CPU 301, a ROM 302, a RAM 303, a flash memory 304, an external device connection I/F 316, and a bus line 320.

Among them, the CPU 301 controls an operation of an entire information storage device 3. The ROM 302 stores a program used for driving the CPU 301. The RAM 303 is used as a work area for the CPU 301. The flash memory 304 reads various pieces of data such as the license information under the control of the CPU 301. The external device connection I/F 316 is an interface for connecting to the information processing apparatus 2, and is, for example, a USB interface. The bus line 320 is an address bus and a data bus for electrically connecting the components such as the CPU 301.

The above-described program may be recorded as a file in a format installable or executable on a computer-readable recording medium, or downloaded via a network for distribution. The recording medium includes, for example, a compact disc-recordable (CD-R), a digital versatile disc (DVD), and a BLU-RAY disc, an SD card, and a USB memory.

The recording medium may be provided in the form of a program product within a certain country or outside that country. For example, the information processing apparatus 2 implements the method for processing information according to one embodiment of the present disclosure by execution of the program according to the embodiment of the present disclosure.

Figure 4:
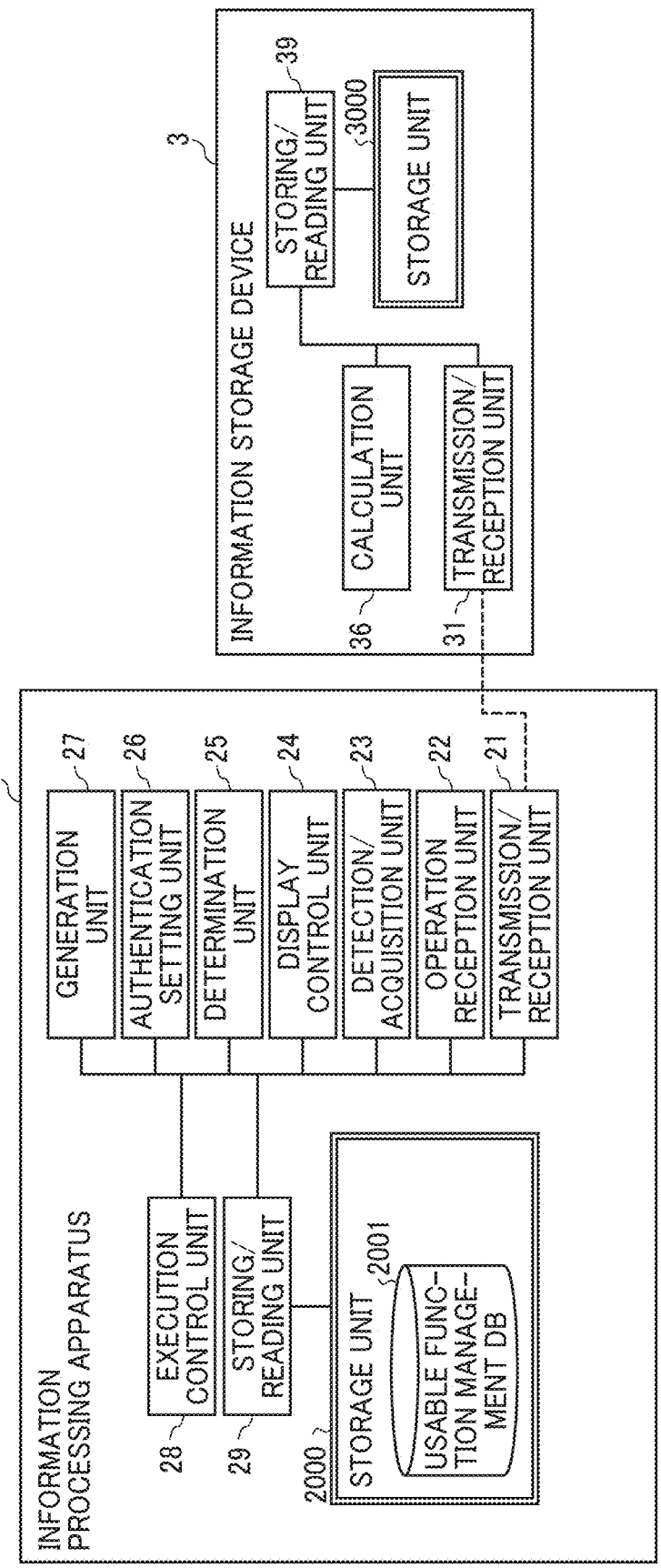
FIG. 4 is a diagram illustrating a functional configuration of the information processing apparatus and a functional configuration of the information storage device according to the first embodiment.

Functional Configurations of Information Processing Apparatus and Information Storage Device A functional configuration of the present embodiment is next described with reference to FIGS. 4 and 5. FIG. 4 is a diagram illustrating a functional configuration of the information processing apparatus and that of the information storage device according to the first embodiment. FIG. 4 illustrates, among the functional configurations of the information processing apparatus 2 or the information storage device 3 illustrated in FIGS. 2 and 3, those related to processing or operation to be described later.

Functional Configuration of Information Processing Apparatus

A description is given of the functional configuration of the information processing apparatus. As illustrated in FIG. 4, the information processing apparatus 2 includes a transmission/reception unit 21, an operation reception unit 22, a detection/acquisition unit 23, a display control unit 24, a determination unit 25, an authentication setting unit 26, a generation unit 27, an execution control unit 28, and a storing/reading unit 29. Each of the functional units provides a function as one or more of the hardware resources illustrated in FIG. 2 operate according to instructions from the CPU 201 executing a program for the information processing apparatus 2, loaded from at least one of the ROM 202a and the HD 208 into the RAM 202b.

The information processing apparatus 2 further includes a storage unit 2000 that is constructed by at least one of the ROM 202a or the HD 208 illustrated in FIG. 2. The storage unit 2000 further stores a communication program and a data table for performing communication with the information storage device 3 via the USB interface.

Functional Configuration of Information Processing Apparatus

The functional configuration of the information processing apparatus 2 is described in detail below.

The transmission/reception unit 21 of the information processing apparatus 2 illustrated in FIG. 4 is implemented by, for example, processing of the CPU 201 with respect to the external device connection I/F 225 and the network I/F 250, and transmits/receives various pieces of data (or information) to/from the information storage device 3 particularly via the USB interface as the external device connection I/F 225. The transmission/reception unit 21 receives, from the communication terminal 4, a notification that execution of the process related to the predetermined function is restricted when communication with the information processing apparatus 2 is established, but the license information is not acquired. In the present embodiment, the transmission/reception unit 21 is as an example of at least one of a transmission means and a reception means.

The operation reception unit 22 is implemented by, for example, the CPU 201 processing signals generated by various operations received by at least one of the panel display 240a or the operation key 240b. In the present embodiment, the operation reception unit 22 is an example of a reception means.

The detection/acquisition unit 23 is implemented by, for example, processing of the CPU 201 with respect to the external device connection I/F 225. The detection/acquisition unit 23 acquires various pieces of information such as the license information stored in the information storage device 3 connected via the external device connection I/F 225, and type information of the information processing apparatus 2. An example of type information is printing performance represented by pages per minute (ppm) indicated as, for example, 100 ppm or 110 ppm. When the information storage device 3 (dongle) connectable to the information processing apparatus 2 that stores the license information is connected to the information processing apparatus 2, the detection/acquisition unit 23 acquires the license information from the information storage device 3. At that time, the information processing apparatus 2 can detect attachment/detachment (connection/disconnection) of the dongle using Plug and Play (PnP) of the USB. In the present embodiment, the detection/acquisition unit 23 is as an example of an acquisition means.

The display control unit 24 is implemented by, for example, processing of the CPU 201 with respect to the panel display 240a, and performs display control of various screens and information (data) in the information processing apparatus 2. The display control unit 24 causes the panel display 240a to display a notification that execution of the process related to the predetermined function is stopped in accordance with the stop of a subsequent process.

The display control unit 24 can also cause the panel display 240a to display a display screen generated by HTML using, for example, a browser. In the present embodiment, the display control unit 24 is as an example of a display control means.

The determination unit 25 is implemented by, for example, processing of the CPU 201, and performs various determinations inside the information processing apparatus 2.

In a case where the information processing apparatus 2 is powered without the information storage device 3, the determination unit 25 determines whether to perform a predetermined notification by the display control unit 24 or to execute a process related to a low-productivity function according to function information stored in the information processing apparatus 2. In the present embodiment, the determination unit 25 is as an example of a determination means.

The authentication setting unit 26 is implemented by, for example, processing of the CPU 201, and performs processing including authentication processing of a user who uses the information processing apparatus 2 and license authentication processing between the dongle and the information processing apparatus 2. In the present embodiment, the authentication setting unit 26 is an example of a determination means.

The generation unit 27 is implemented by, for example, processing of the CPU 201, and generates various pieces of screen information to be displayed on the panel display 240a. In the present embodiment, the generation unit 27 is as an example of a generation means.

The execution control unit 28 is implemented by, for example, processing of the CPU 201, and executes various pieces of processing in the information processing apparatus 2. In a case where, during the execution of the process related to a predetermined function, the state of the license information being acquired has changed and the detection/acquisition unit 23 no longer acquires the license information (state of not acquired), the execution control unit 28 restricts the execution of the process related to the predetermined function. The execution control unit 28 stops execution of the subsequent process related to the predetermined function after the process of the predetermined function currently executed completes, as restriction of the execution of the process related to the predetermined function. The execution control unit 28 executes a process of a function whose productivity is lower than the function executed when the license information is acquired. In a case where the state of the license information being acquired continues during the use of the predetermined function, the execution control unit 28 executes, related to the predetermined function, a process that achieves higher productivity (e.g., higher ppm) than the process permitted in the state of the license information not acquired. The state of the license information being acquired is that the information processing apparatus 2 is powered on and the information storage device 3 is connected to the information processing apparatus 2. Further, the state of the license information being acquired is that the information storage device 3 is connected to the information processing apparatus 2 and activation of the process related to the predetermined function is already executed. In a case where the transmission/reception unit 21 receives, from the communication terminal 4, a notification that the execution of the process related to a predetermined function is restricted during the execution of the process related to the predetermined function, the execution control unit 28 restricts the execution of the process related to the predetermined function. In the present embodiment, the execution control unit 28 is as an example of a control means.

The storing/reading unit 29 is implemented by, for example, processing of the CPU 201 with respect to at least one of the ROM 202a or the HD 208, stores various pieces of data (or information) in the storage unit 2000, and reads various pieces of data (or information) from the storage unit 2000. In the present embodiment, the storing/reading unit 29 is as an example of a storing/reading means.

Usable Function Management Table

FIG. 5 is a conceptual diagram illustrating an example of a usable function management table. The data table described below is an example, and data table according to the present disclosure is not limited thereto. The storage unit 2000 includes a usable function management database (DB) 2001 in the form of the usable function management table as illustrated in FIG. 4. The usable function information management table stores a function (usable function) executable by the information processing apparatus 2 in association with a function ID as identification information for identifying the function. Examples of the usable function include monochrome/color switching, enable/disable switching of a special color, enable/disable switching of an automatic alignment function, and a peripheral device configuration.

The monochrome/color switching is for switching between monochrome and monochrome/color printing in a printing apparatus as an example of the information processing apparatus 2. In a case of monochrome printing, an adjustment operation related to CMY indicating colors to be used only for color such as color matching becomes unnecessary.

Therefore, an adjustment time can be shortened, and a start-up time can be shortened. The monochrome/color may be switched to "color" when the information storage device 3 is connected to the information processing apparatus 2 and switched to "monochrome" when the information storage device 3 being connected or unconnected to the information processing apparatus 2 is disconnected, or vice versa.

The special color switches whether special color printing other than CMYK is possible. In a case where the special color printing is not functionally allowed, it is not necessary to perform toner remaining amount detection, abnormality detection related to the special color, and an adjustment operation. Therefore, the adjustment time can be shortened as compared with a case where the special color operation is not performed. It is also possible to delete unnecessary display such as no special color toner.

The special color may be "valid" in a case where the information storage device 3 is connected to the information processing apparatus 2, and may be "invalid" in a case where the information storage device 3 is in the disconnected state or in a case where the connected state changes to the unconnected state, or vice versa.

The automatic alignment function switches whether to enable the automatic alignment function by providing a line sensor inside the information processing apparatus 2. The line sensor is assumed to be a contact image sensor (CIS), a charge coupled device (CCD) image sensor, and a complementary metal oxide semiconductor (CMOS) image sensor. In a case where such a function is used, an adjustment operation such as shading correction for making a reading level for each pixel uniform is necessary, but in a case where the function is not necessary, the adjustment operation is not necessary, so that it is possible to skip the adjustment operation and shorten the start-up time.

The automatic alignment function may be "valid" in a case where the information storage device 3 is connected to the information processing apparatus 2, and may be "invalid" in a case where the information storage device 3 is in the unconnected state or in a case where the connected state is changed to the unconnected state, or vice versa.

The peripheral device configuration switches whether to restrict the configuration of the peripheral device. The information processing apparatus 2 can be connected to the peripheral device for executing post-processing such as folding, cutting, gluing, and stacker in addition to a peripheral device for paper feeding such as a paper feed tray, a manual feed tray, and a long sheet tray.

Gluing takes a long time to warm up, and it takes time to start up. In a case where this function is not allowed, it is not necessary to wait for the start-up time, so that it is possible to shorten the start-up time.

As for the peripheral device configuration, it may be set that each function is "valid" when the information storage device 3 is connected to the information processing apparatus 2, and each function is "invalid" in a case where the information storage device 3 is in the disconnected state or the disconnected state changes to the unconnected state, or vice versa.

As described above, the usable function management DB 2001 can manage various functions available in the information processing apparatus 2 in association with the function ID. However, in the information processing apparatus 2, the type of the machine at the previous startup acquired from the information storage device 3 may be stored in the usable function management DB 2001 or a predetermined area of the storage unit 2000.

On the basis of the information by the storage processing, processing is performed by comparing each piece of information with the dongle connected to the information processing apparatus 2.

In the present embodiment, the usable function management table (usable function management DB 2001) is an example of a usable function management means.

Functional Configuration of Information Storage Device

Subsequently, a functional configuration of the information storage device will be described. As illustrated in FIG. 4, the information storage device 3 includes a transmission/reception unit 31, a calculation unit 36, and a storing/reading unit 39. Each of the functional units provides a function as one or more of the hardware resources illustrated in FIG. 3 operate according to instructions from the CPU 301 executing a program for the information storage device 3, loaded from at least one of the ROM 302 and the flash memory 304 into the RAM 303.

The information storage device 3 includes a storage unit 3000 that is constructed by at least one of the ROM 302 and the flash memory 304 illustrated in FIG. 3. The storage unit 3000 stores a communication program (communication application) for performing communication with the information processing apparatus 2 via the USB interface.

Functional Configuration of Information Processing Apparatus

The functional configuration of the information storage device 3 is described in detail below. The transmission/reception unit 31 of the information storage device 3 illustrated in FIG. 4 is implemented by, for example, processing of the CPU 301 with respect to the I/F 305, and transmits/receives various pieces of data (or information) to/from the information processing apparatus 2 via the communication network 100. The transmission/reception unit 31 receives a mark provision request for providing a first predetermined mark and a second predetermined mark transmitted by the information processing apparatus 2. In the present embodiment, the transmission/reception unit 31 is an example of at least one of a second transmission unit and a second reception means.

The calculation unit 36 is implemented by, for example, processing of the CPU 301, and performs various calculations in the information storage device 3. In the present embodiment, the calculation unit 36 is an example of a calculation means.

The storing/reading unit 39 is implemented by, for example, processing of the CPU 301 with respect to at least one of the ROM 302 and the flash memory 304, and reads various pieces of data (or information) such as the license information from the storage unit 3000. In the present embodiment, the storing/reading unit 39 is an example of a storing/reading means.

Processing or Operation of Embodiment

The processing or operation in the information processing apparatus according to the first embodiment will be described with reference to FIGS. 6 to 13.

Figure 6:
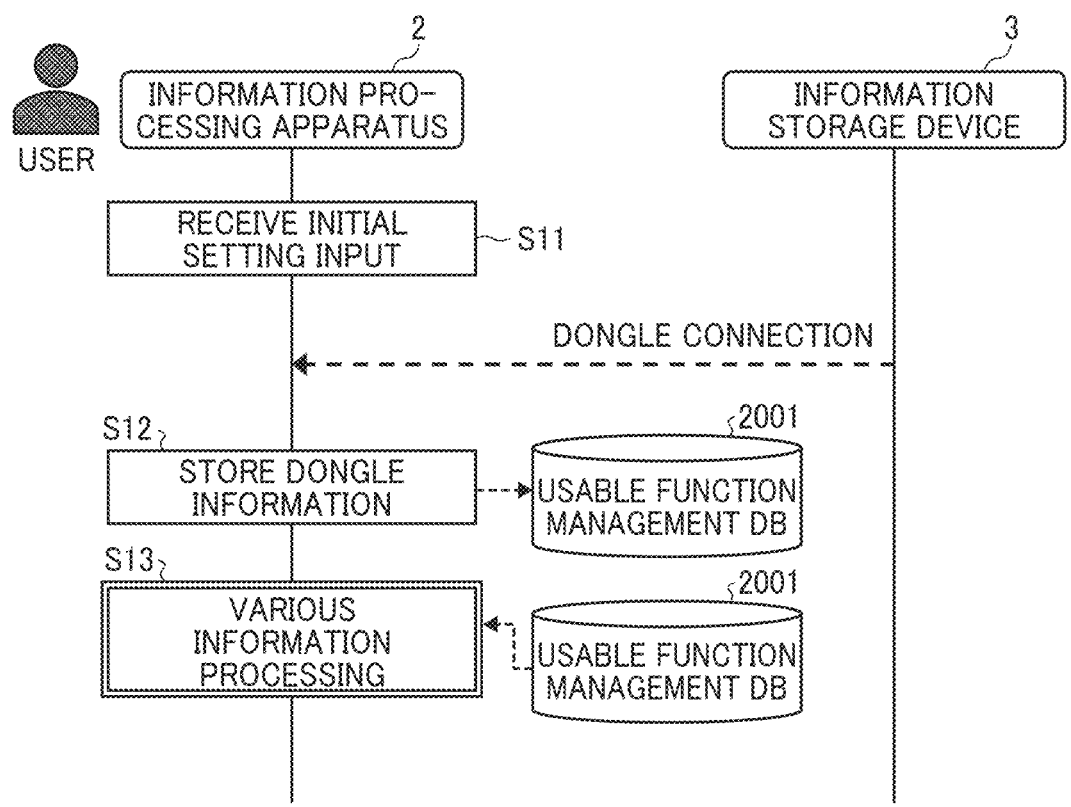
FIG. 6 is a sequence diagram including processing of various information between the information processing apparatus and the information storage device according to the first embodiment.

Sequence Processing Executed between Information Storage Device and Information Processing Apparatus FIG. 6 is a sequence diagram including various types of information processing between the information processing apparatus and the information storage device according to the first embodiment.

First, the operation reception unit 22 of the information processing apparatus 2 receives an initial setting input by the user (step S11). Specifically, the operation reception unit 22 receives, as the initial setting input, setting values input for executing predetermined processes for various functions in the information processing apparatus 2. This setting value input is performed by an input to the control panel 240.

Then, the storing/reading unit 29 stores dongle information (step S12). Specifically, after detecting that a dongle is connected to the external device connection I/F 225 (for example, the USB interface) of the information processing apparatus 2, the storing/reading unit 29 stores various pieces of information acquired from the dongle in items managed by the usable function associated with the function ID of the usable function management DB 2001 (refer to FIG. 5). The dongle is an example of the information storage device 3.

Then, the various functional units including the execution control unit 28 execute various pieces of information processing (step S13). At that time, the information processing apparatus 2 can read various pieces of information from the usable function management DB 2001 to perform the process.

Details of Processing of Various Pieces of Information

Figure 7:
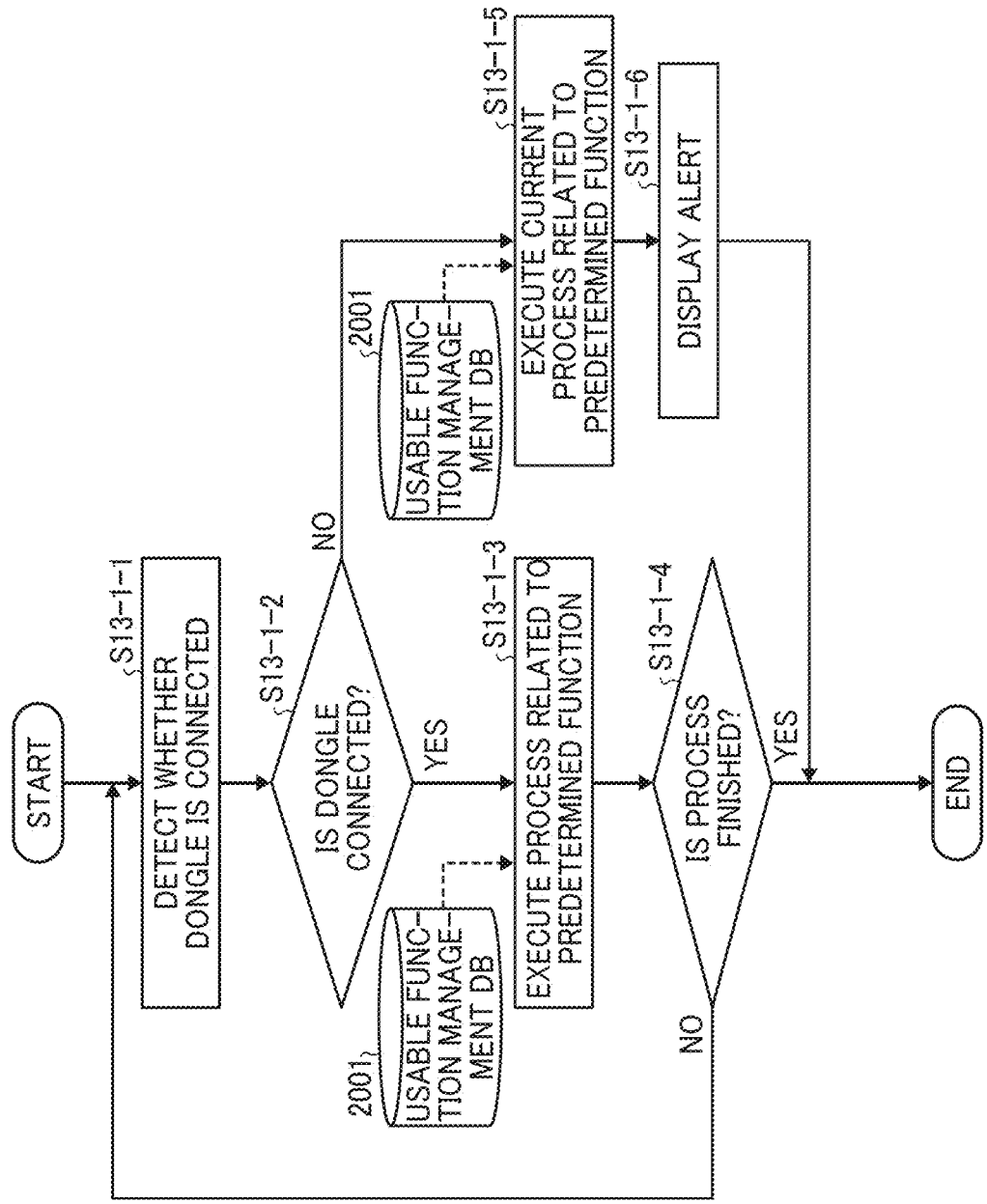
FIG. 7 is a flowchart illustrating processing of various information according to the first embodiment.

The processing of various pieces of information is described below in detail. FIG. 7 is a flowchart illustrating processing of various information according to the first embodiment. The flowchart illustrated in FIG. 7 is an example, and the processing according to embodiments of the present disclosure is not limited thereto.

First, the detection/acquisition unit 23 of the information processing apparatus 2 detects the connection of the dongle as an example of the information storage device 3 (step S13-1-1). Specifically, the detection/acquisition unit 23 detects whether the dongle is connected to the external device connection I/F 225 (USB interface).

Then, the determination unit 25 determines whether the dongle is connected (step S13-1-2). For example, the determination unit 25 may acquire a signal from the detection/acquisition unit 23 by polling using a clock of the CPU 201 in the information processing apparatus 2, and determine the dongle connection on the basis of the signal.

In a case where it is determined that the dongle is connected (step S13-1-2: YES), the execution control unit 28 executes process related to a predetermined function (e.g., print job) (step S13-1-3). Specifically, the execution control unit 28 executes the process related to the predetermined function with reference to the usable functions associated with the function IDs stored in the usable function management DB 2001 (refer to FIG. 5) on the basis of the license information acquired by the dongle connected to the information processing apparatus 2.

Then, the determination unit 25 determines whether the processing (e.g., print job) is finished (step S13-1-4). In a case where the processing is not finished (step S13-1-4: NO), the determination unit 25 returns to step S13-1-1, and in a case where the printing is finished (step S13-1-4: YES), the determination unit 25 exits this flow.

By contrast, in a case where it is determined that no dongle is connected (step S13-1-2: NO), the execution control unit 28 executes current process related to the predetermined function (step S13-1-5). Although, at step S13-1-5, the execution control unit 28 executes the process related to the predetermined function similar to that at step S13-1-3, the execution control unit 28 executes only the process currently executed (e.g., a current print job) by the information processing apparatus 2. After the current processing is executed, the execution control unit 28 stops (cancels) the subsequent processing. The execution control unit 28 further disables the use of the predetermined function in a maintenance mode (may be called a "service mode") executable by a seller in the information processing apparatus 2. As a result, prevention of unauthorized use is enhanced.

After executing the current processing, the display control unit 24 displays an alert and exits this flow (step S13-1-6). The reason for performing the action at step S13-1-6 is to prevent the unauthorized use in the state without the dongle. Further, this action avoids a paper jam due to the interruption of the processing in the information processing apparatus 2 such as an MFP.

Screen Display Example

Figure 8:
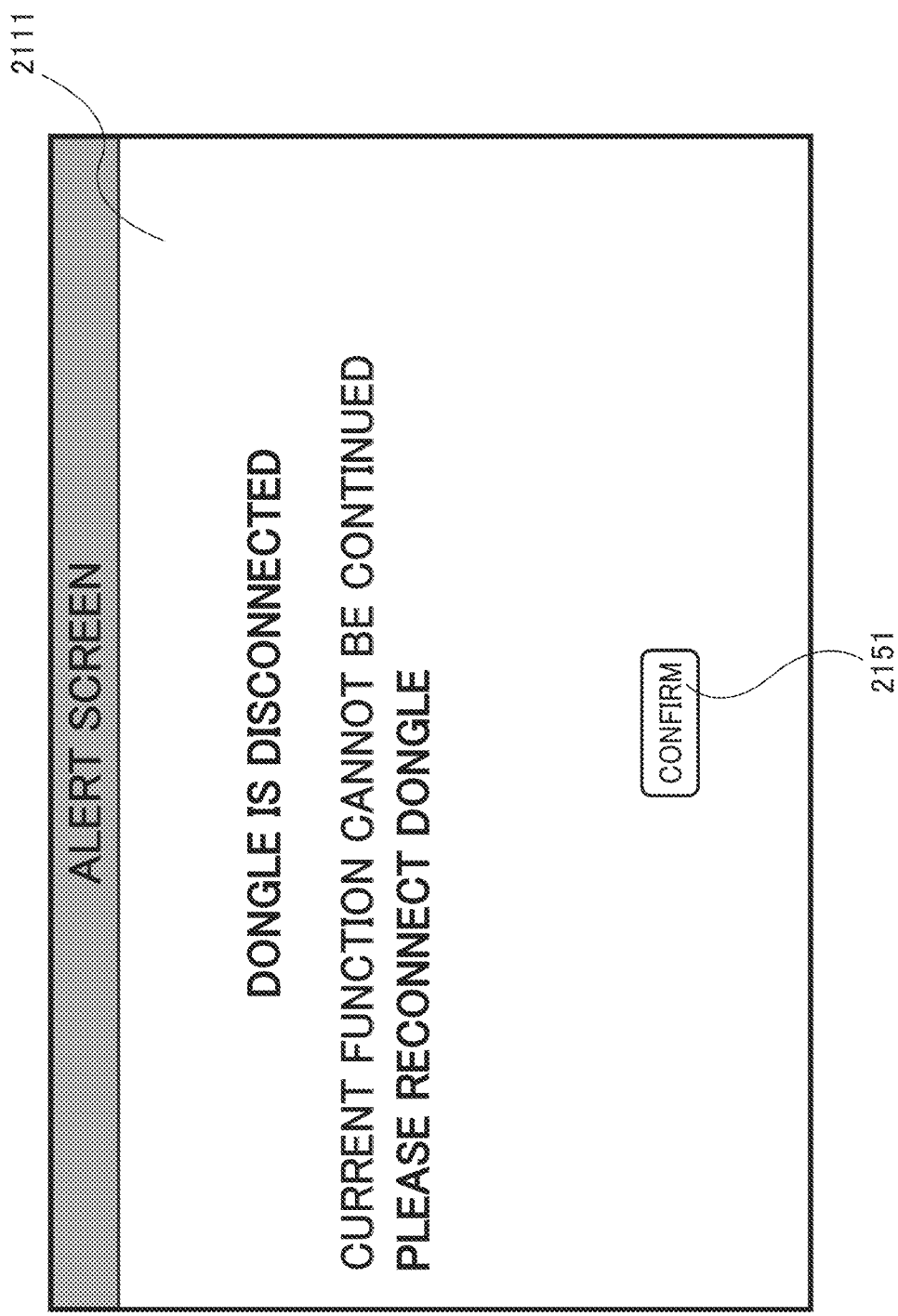
FIG. 8 is a diagram illustrating an alert display screen in the information processing apparatus according to the first embodiment.

A display screen example in the information processing apparatus 2 will be described. FIG. 8 is a diagram illustrating an alert display screen in the information processing apparatus according to the first embodiment. As illustrated in FIG. 8, an alert screen 2111 is displayed on the panel display 240a of the information processing apparatus 2 by the display control unit 24. On the alert screen 2111, a message that the dongle is disconnected and a message prompting reconnection of the dongle are displayed. A confirmation button 2151 is further displayed on the alert screen 2111. The information processing apparatus 2 may allow the user to operate the confirmation button 2151 to receive the reconnection of the dongle.

The purpose of displaying the alert screen illustrated in FIG. 8 and stopping the subsequent processing after completion of the current processing is, for example, as follows. This is to prevent an unauthorized use of the information processing apparatus 2 and falsification of the functions in a case where a user attempts to use a predetermined function with the dongle disconnected or not connected from the power-on of the information processing apparatus 2. For example, assume that the price of the dongle sold in a country A is a price P, and the price of the dongle sold in a country B is a price P+ higher than the price P. In this situation, if a certain user attempts to use the information processing apparatus 2 in the country B using the dongle purchased at the price P in the country A, it will be disadvantageous to the seller of the information processing apparatus 2 and the dongle in the country B. In order to prevent such a disadvantage, in the manner of guaranteeing a function under a predetermined license acquired from the connected dongle, the subsequent process for the function is stopped when the dongle is not connected (including disconnection of the dongle in the middle of use of the function). This configuration prevents the disadvantage caused by the unauthorized use of the information processing apparatus 2 in advance and protects the seller.

Details of Another Processing of Various Pieces of Information

Figure 9:
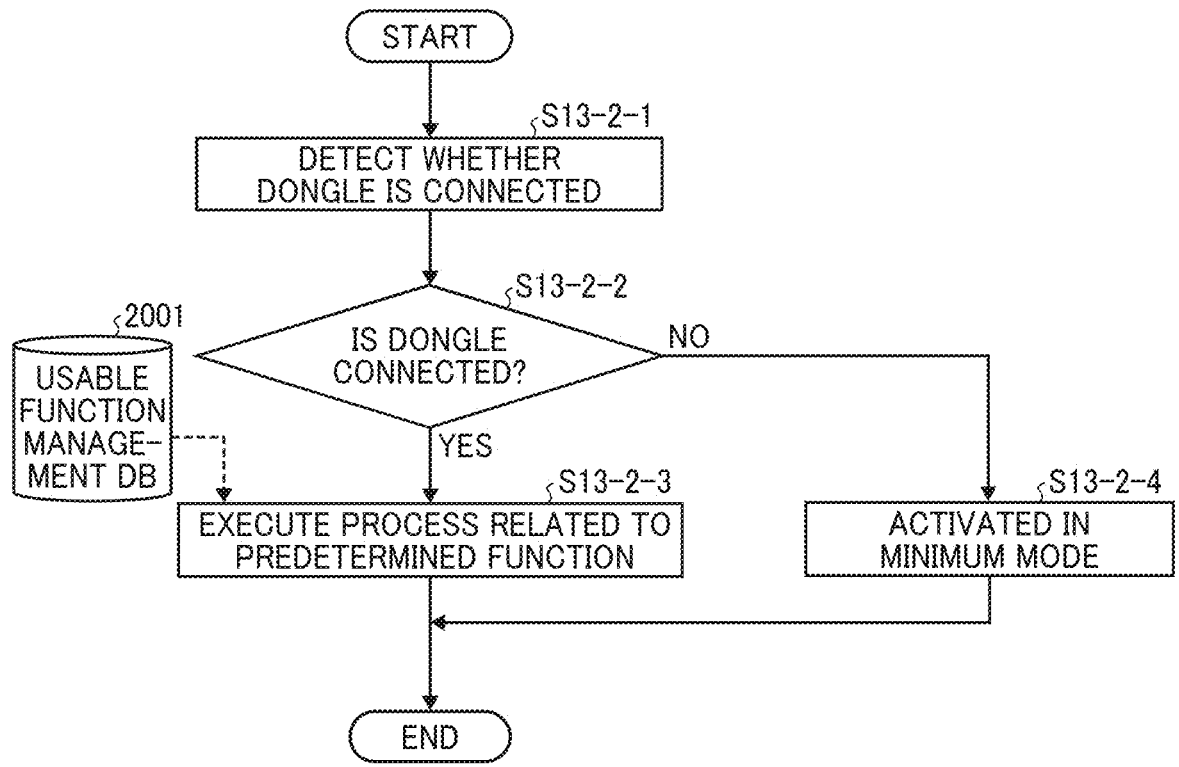
FIG. 9 is a flowchart illustrating another processing of various information according to the first embodiment.

FIG. 9 is a flowchart illustrating another processing of various information according to the first embodiment. The flowchart illustrated in FIG. 9 is an example, and the processing according to embodiments of the present disclosure is not limited thereto. The processing at steps S13-2-1 to S13-2-3 executed in this flowchart is similar to the processing at steps S13-1-1 to S13-1-3 described above, so that the description thereof is omitted.

In FIG. 9, in a case where no dongle is connected, i.e., NO in step S13-2-2, the execution control unit 28 is activated in a minimum mode (step S13-2-4), and exits this flow. The minimum mode in this case is, for example, a mode having the lowest productivity when the information processing apparatus 2 can switch productivity depending on the dongle connection. This configuration prevents inadvertently allowing a function of predetermined productivity or greater, protected by the license.

The processing based on the flowchart illustrated in FIG. 9 may be processing immediately after the information processing apparatus 2 is powered on.

Details of Another Processing of Various Pieces of Information

Figure 10:
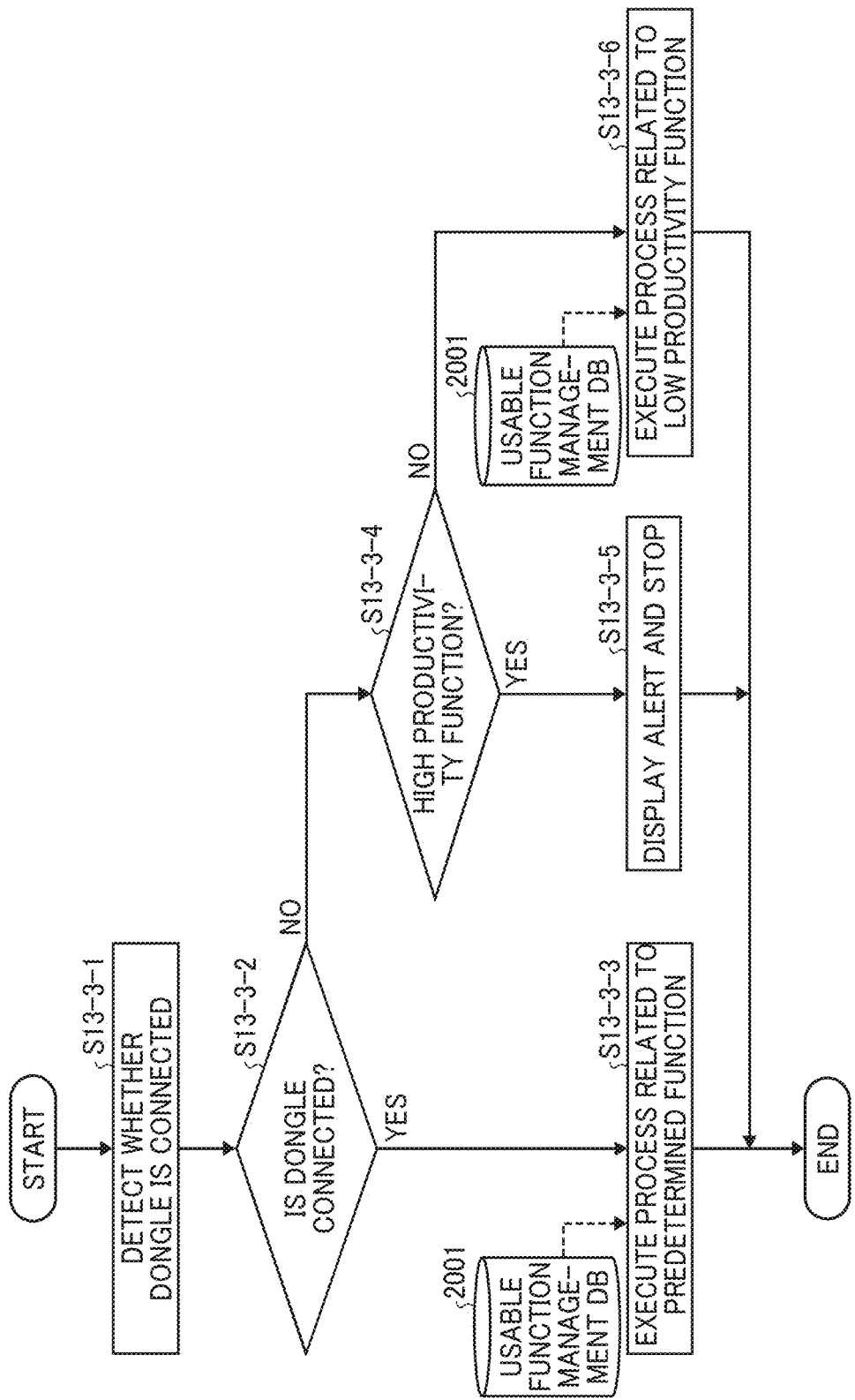
FIG. 10 is a flowchart illustrating another processing of various information according to the first embodiment.

A description will be given below of another detailed processing of the various pieces of information in consideration of the productivity of the information processing apparatus 2. FIG. 10 is a flowchart illustrating another processing of various information according to the first embodiment. The flowchart illustrated in FIG. 10 is an example, and processing according to embodiments of the present disclosure is not limited thereto. The processing at steps S13-3-1 to S13-3-3 executed in this flowchart is similar to the processing at steps S13-1-1 to S13-1-3 described above, so that the description thereof is omitted.

Figure 11:
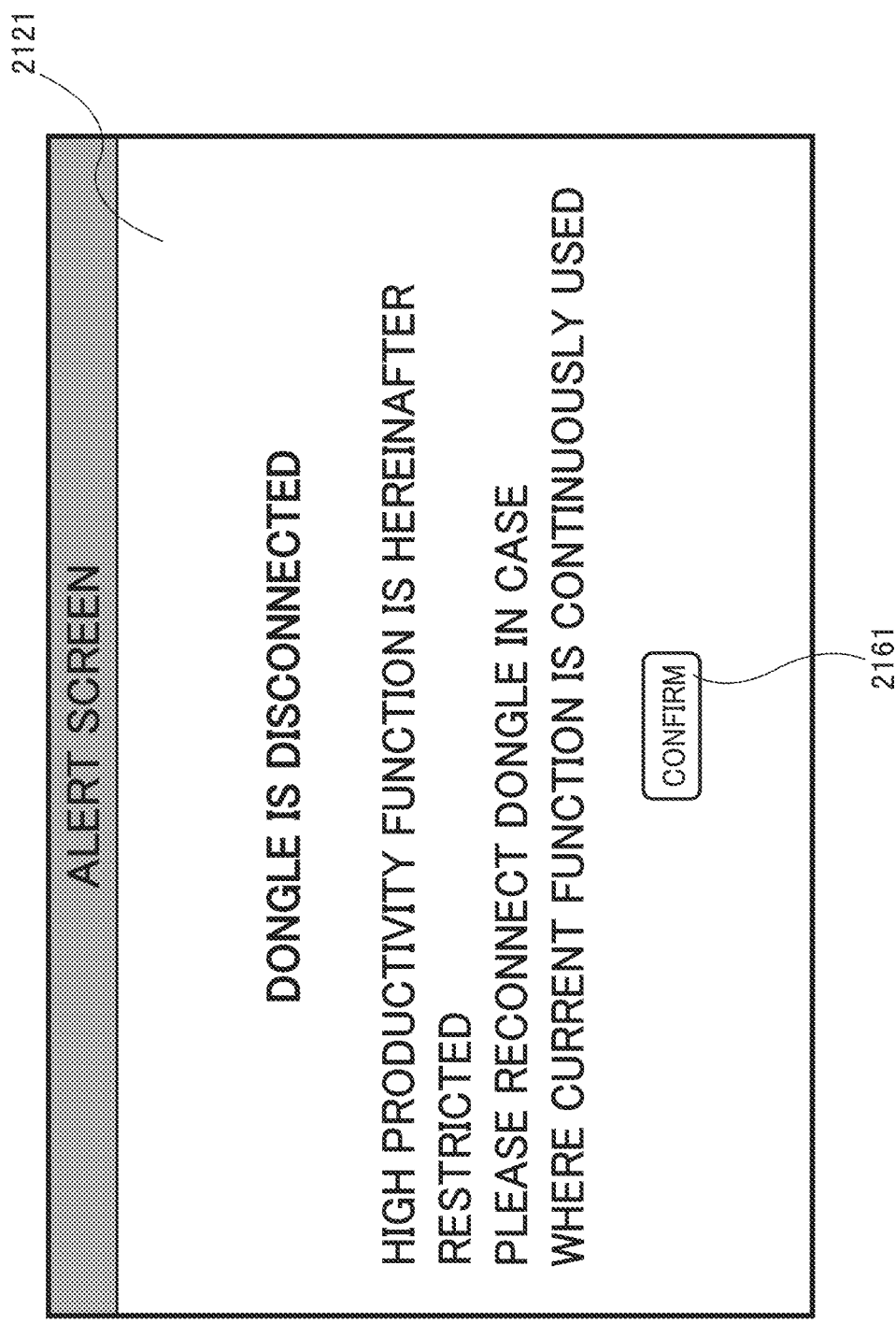
FIG. 11 is a diagram illustrating another alert display screen in the information processing apparatus according to the first embodiment.

In FIG. 10, in particular, in a case where no dongle is connected when the information processing apparatus 2 is powered on, i.e., NO in step S13-3-2, the determination unit 25 further determines whether the information processing apparatus 2 is in a state or a setting of executing the high productivity function (step S13-3-4). In a case where the information processing apparatus 2 is in the state or setting of executing the high productivity function (step S13-3-4: YES), the display control unit 24 displays an alert (step S13-3-5) and exits this flow. Specifically, the display control unit 24 causes the panel display 240a to display the alert screen as illustrated in FIG. 11 to stop the processing, and exits this flow.

In the present embodiment, the high productivity refers to, for example, in an MFP, linear speed is faster than that of a low-productivity MFP.

By contrast, in a case where the information processing apparatus 2 is not in the state or setting of executing the high productivity function (step S13-3-4: NO), the execution control unit 28 executes a process that achieves low productivity (step S13-3-6) and exits this flow. The low productivity function at that time refers to a function other than the function executable only under a predetermined license acquired from the connected dongle. These functions are not particularly limited and can be, for example, functions that are set by the user and do not require the dongle connection managed by the usable function management DB 2001. This configuration prevents inadvertently allowing a function of predetermined productivity or greater, protected by the license.

Screen Display Example

FIG. 11 is a diagram illustrating another example of the alert display screen in the information processing apparatus according to the first embodiment. As illustrated in FIG. 11, an alert screen 2121 is displayed on the panel display 240a of the information processing apparatus 2 by the display control unit 24 by the processing at step S13-3-5. On the alert screen 2121, a message that the dongle is disconnected and a message prompting reconnection of the dongle because the high productivity function is restricted are displayed. A confirmation button 2161 is further displayed on the alert screen 2121.

The information processing apparatus 2 may allow the user to operate the confirmation button 2161 to receive reconnection of the dongle. The purpose of displaying the alert screen as illustrated in FIG. 11 is similar to that of the case illustrated in FIG. 9.

Processing Associated with Activation in Dongle Connection

Figure 12:
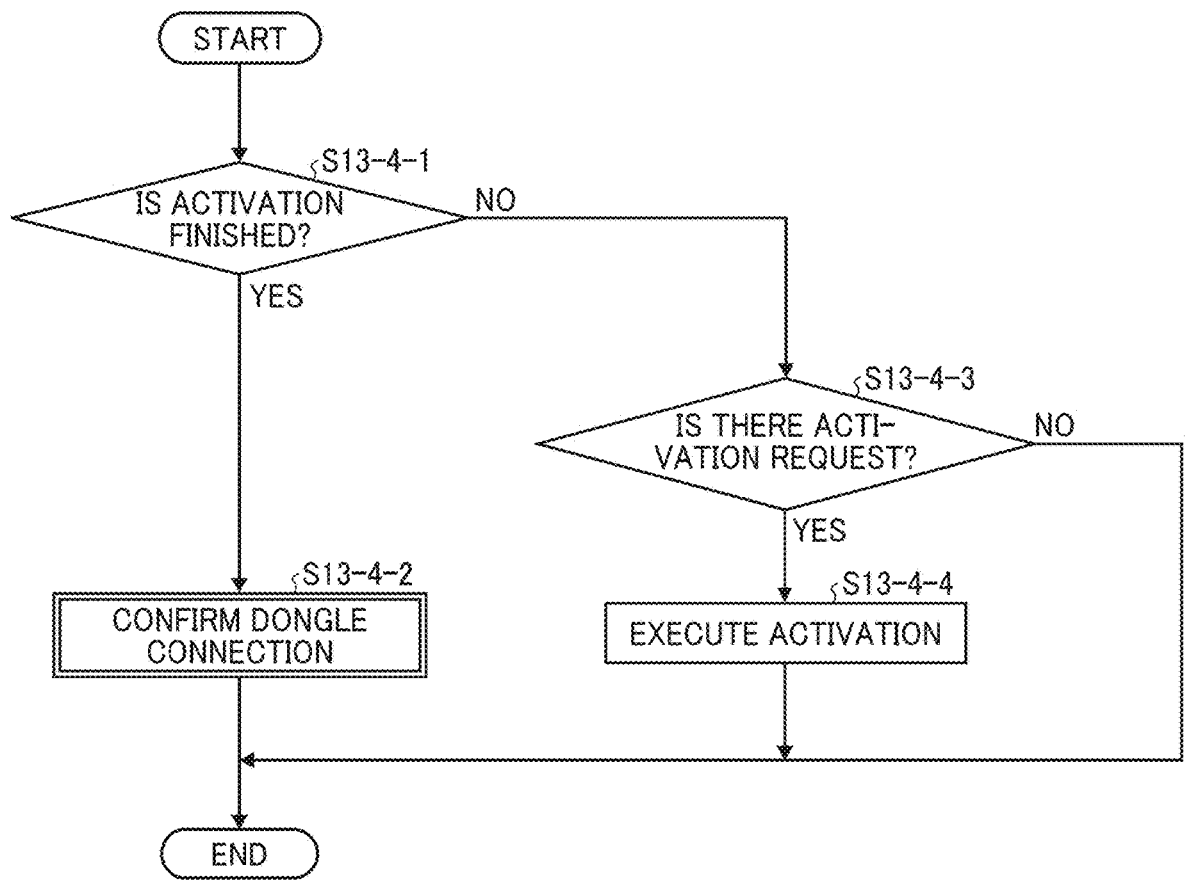
FIG. 12 is a flowchart illustrating another processing of various information according to the first embodiment.

Subsequently, processing associated with activation in the dongle connection will be described. FIG. 12 is a flowchart illustrating another processing of various information according to the first embodiment. The flowchart illustrated in FIG. 12 is an example, and the processing according to embodiments of the present disclosure is not limited thereto. The determination unit 25 of the information processing apparatus 2 determines whether the activation is finished when the information processing apparatus 2 is powered on (step S13-4-1). In a case where the activation is finished (step S13-4-1; YES), the detection/acquisition unit 23 confirms the dongle connection (step S13-4-2) and exits this flow.

The confirmation of the dongle connection at step S13-4-2 is, for example,
1. Detection of the dongle connection by the detection/acquisition unit 23, and
2. License authentication processing between the dongle and the information processing apparatus 2 by the authentication setting unit 26.

Figure 13:
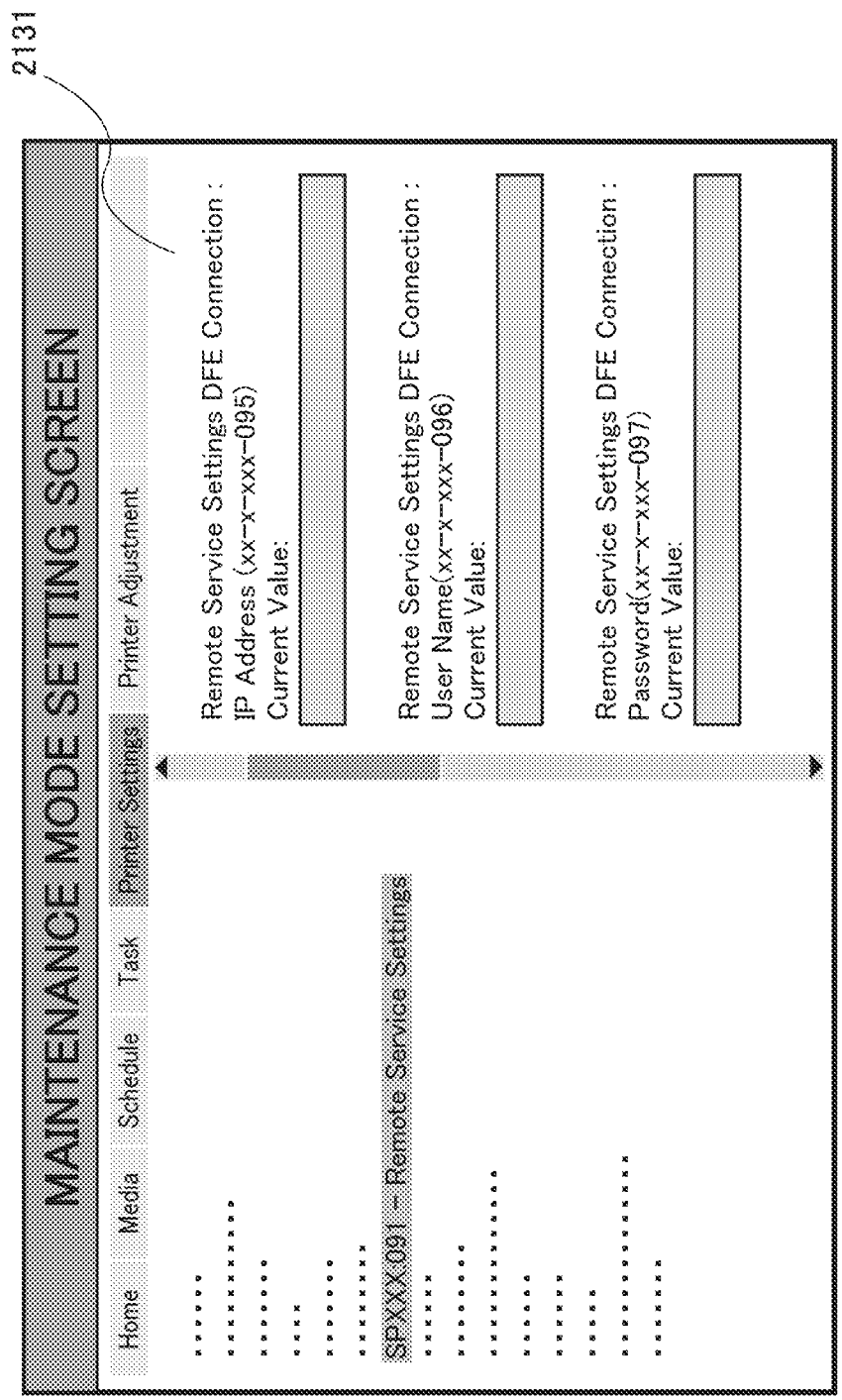
FIG. 13 is a diagram illustrating an activation screen in the information processing apparatus according to the first embodiment.

By contrast, in a case where the activation is not finished (step S13-4-1: NO), the determination unit 25 further determines that there is an activation request (step S13-4-3). The determination as to whether there is the activation request is, for example, determining whether a maintenance mode setting screen (service mode setting screen) illustrated in FIG. 13 is activated by a service person on the seller side.

In a case where there is the activation request (step S13-4-3: YES), the execution control unit 28 executes the activation (step S14-4-4) and exits this flow. Specifically, the execution control unit 28 receives the activation of the maintenance mode setting screen (service mode setting screen) illustrated in FIG. 13 and an input of a desired setting value by the service person on the seller side, and sets a function according to the license given to the information processing apparatus 2.

By contrast, in a case where there is no activation request (step S13-4-3: NO), the determination unit 25 exits this flow. As described above, in the example illustrated in FIG. 12, for example, there is a background that it is desired to issue an alert because the dongle is changed from the connected state to the non-connected state after becoming a high productivity information processing apparatus.

Therefore, on the premise that it is activated once, the above-described processing is performed for the purpose of issuing a predetermined alert in a case where the dongle is changed from the connected state to the non-connected state.

Screen Display Example

FIG. 13 is a diagram illustrating an example of an activation screen in the information processing apparatus according to the first embodiment.

As illustrated in FIG. 13, by the processing at step S13-4-4, a maintenance mode setting screen 2131 for activation is displayed on the panel display 240*a* of the information processing apparatus 2 by the display control unit 24.

On the maintenance mode setting screen 2131, the service person on the seller side can execute the activation on the information processing apparatus 2 by performing an input for desired setting using the maintenance mode setting screen 2131.

As a result, in the information processing apparatus 2 allowed to execute a predetermined function under the license given by the dongle connection, an unauthorized use of the function can be further prevented in advance.

Main Effect of First Embodiment

As described above, according to the present embodiment, the information processing apparatus 2 acquires the license information indicating the license (step S13-1-1), and restricts the execution of the process related to the predetermined function in a case where the state of acquisition of the license information changes to a state of not acquired in the execution of the process related to the predetermined function (step S13-1-3, S13-1-5).

As a result, there is an effect that even in a case where there is a change in the acquisition state of the license information enabling the execution of the process during the execution of the process related to the predetermined function, it is possible to perform a process according to the change.

Second Embodiment

Subsequently, processing or an operation performed by an information processing system according to a second embodiment will be described with reference to FIGS. 14 to 22.

In the second embodiment, the information processing system 1 includes a communication terminal 4 that communicates with the information processing apparatus 2. A description is given of operation of the information processing system 1 in which a dongle is connected to the communication terminal 4 instead of the information processing apparatus 2. Since the hardware configurations and the functional configurations of the information processing apparatus 2 and the information storage device 3 of the information processing system 1 according to the first embodiment are applicable to the second embodiment, the redundant description will be omitted, and the difference from the first embodiment will be described.

Overall Configuration of Information Processing System

Figure 14:
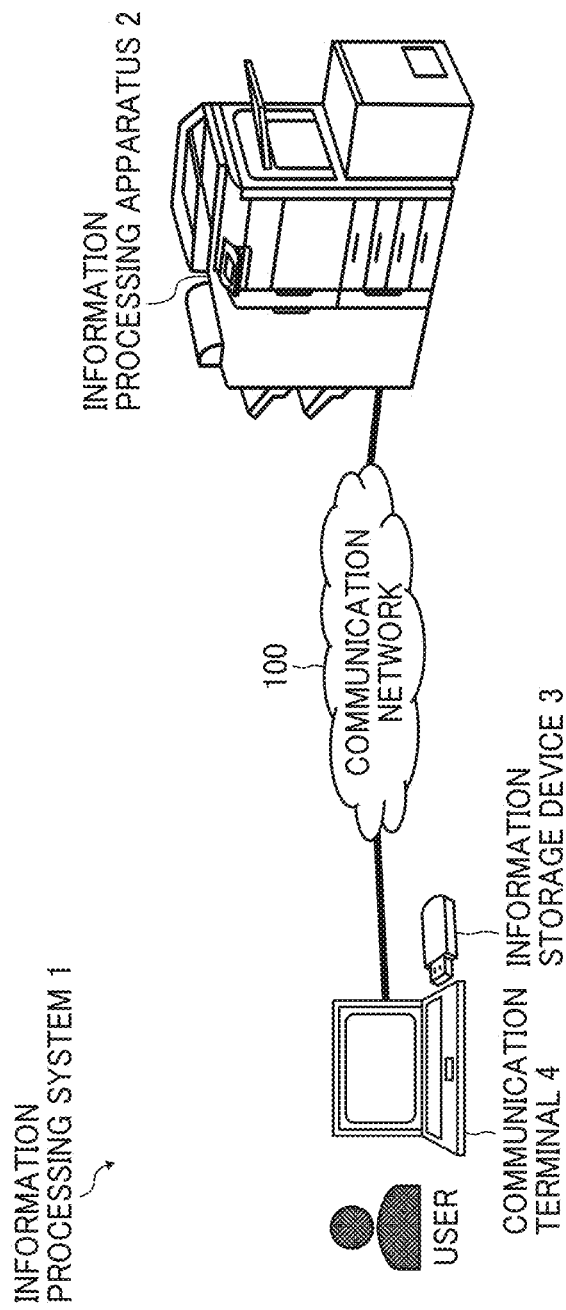
FIG. 14 is a diagram illustrating an overall configuration of an information processing system according to a second embodiment of the present disclosure.

FIG. 14 is a diagram illustrating an example of an overall configuration of the information processing system according to the second embodiment. As illustrated in FIG. 14, the information processing system 1 includes the information processing apparatus 2, the communication terminal 4, and the information storage device 3. The information storage device 3 is connectable or connected to the communication terminal 4. In the information processing system 1, the information processing apparatus 2 and the communication terminal 4 are connected to each other via a communication network 100 for communication.

The communication network 100 is a communication network through which an unspecified number of communications are established, and is constructed by the Internet, an intranet, or a local area network (LAN). The communication network 100 may include a communication network by wireless communication in compliance with the fourth generation (4G), the fifth generation (5G), Worldwide Interoperability for Microwave Access (WiMAX), or Long-Term Evolution (LTE) in addition to wired communication. The information processing apparatus 2 and the information storage device 3 may be directly connected to each other by a dedicated wired cable.

The communication terminal 4 may be implemented by a plurality of computers to each of which units of function or means such as a storage are allocated as desired. All or a part of the functions of the communication terminal 4 may be implemented by a server computer residing on a cloud network or a server computer residing on an on-premises network. As the communication terminal 4, a communication device or a communication terminal that can run software such as browser software may be used.

The communication terminal 4 may notify the information processing apparatus 2 of (transmit to the information processing apparatus 2) data (information) by push notification (transmission). In this case, the communication terminal 4 may perform push notification via, for example, Firebase Cloud Messaging (FCM), which is an example of a push notification server.

Communication Terminal

The communication terminal 4 is a communication terminal that is used by a user who uses the information processing system 1, can communicate with the information processing apparatus 2, and transmits an execution request of a predetermined function and a predetermined notification to the information processing apparatus 2. The communication terminal 4 is implemented by an information processing apparatus (computer system) that performs communication in which a general-purpose operating system (OS) is installed, and is one component constructing the information processing system 1 similarly to the information processing apparatus 2. The communication terminal 4 includes a storage means storing a communication application for communicating with the information processing apparatus 2.

The communication terminal 4 may be a communication terminal having a communication function such as a general personal computer (PC), portable laptop PC, mobile phone, smartphone, tablet communication terminal, or wearable terminal (of sunglass type or wristwatch type). The communication terminal 4 may be a communication device or a communication terminal on which browser software and software of various applications can operate.

Hardware Configurations

A hardware configuration of a communication terminal or a device forming the information processing system according to the embodiment will be described. Components of the hardware configuration of the communication terminal illustrated in FIG. 15 may be added or deleted as necessary. The information processing apparatus 2 and the information storage device 3 have the hardware configurations similar to those of the first embodiment, and redundant descriptions thereof will be omitted.

Hardware Configuration of Communication Terminal

Figure 15:
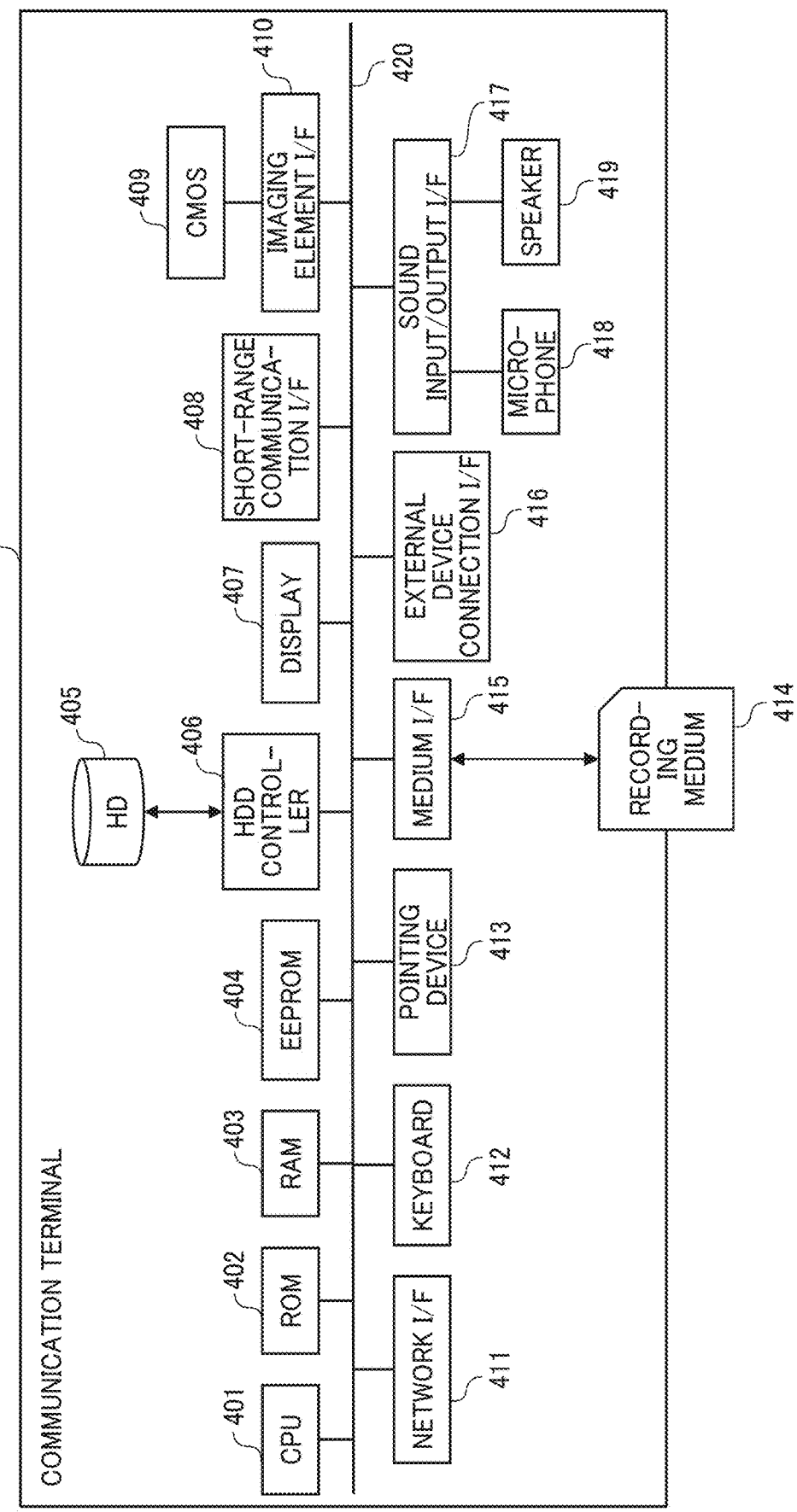
FIG. 15 is a diagram illustrating a hardware configuration of a communication terminal according to the second embodiment.

FIG. 15 is a diagram illustrating an example of a hardware configuration of the communication terminal according to the second embodiment. As illustrated in FIG. 15, the communication terminal 4 includes a CPU 401, a ROM 402, a RAM 403, an electrically erasable programmable read-only memory (EEPROM) 404, a hard disk (HD) 405, a hard disk drive (HDD) controller 406, a display 407, a short-range communication I/F 408, a CMOS sensor 409, and an imaging element I/F 410. The communication terminal 4 further includes a network I/F 411, a keyboard 412, a pointing device 413, a medium I/F 415, an external device connection I/F 416, a sound input/output I/F 417, a microphone 418, a speaker 419, and a bus line 420.

Among them, the CPU 401 controls an entire operation of the communication terminal 4. The ROM 402 stores a program used to drive the CPU 401. The RAM 403 is used as a work area for the CPU 401. The EEPROM 404 reads or writes various pieces of data such as an application under the control of the CPU 401. The HD 405 stores various pieces of data such as a program. The HDD controller 406 controls the reading or writing of various pieces of data from and to the HD 405 under the control of the CPU 401. The communication terminal 4 may include a solid-state drive (SSD) instead of the HD 405 and the HDD controller 406. The display 407 displays various pieces of information such as a cursor, a menu, a window, characters, or an image. The display 407 is as an example of a display means in the present embodiment. The short-range communication I/F 408 is a communication circuit for performing data communication with a communication device or a communication terminal including a wireless communication interface in compliance with, for example, NFC, BLUETOOTH, or WI-FI. The CMOS sensor 409 is a type of a built-in imaging device for obtaining image data or video data by capturing a subject under the control of the CPU 401. The imaging device may be a charge coupled device (CCD) sensor in place of the CMOS sensor. The imaging element I/F 410 is a circuit that controls the drive of the CMOS sensor 409.

The network I/F 411 is an interface for performing data communication using the communication network 100. The keyboard 412 is a type of an input device provided with a plurality of keys used for inputting characters, numerical values, and various instructions. Instead of or in addition to the keyboard 412, an input device such as a predetermined button, and a touch panel that operates icons may be used. The pointing device 413 is a type of an input device used to select or execute various instructions, select a processing target, or move a cursor. The medium I/F 415 reads or writes (stores) data from or to a recording medium 414 such as a flash memory. The external device connection I/F 416 is an interface for connecting various external devices, and is connected to the information storage device 3 using a USB interface or a dedicated wired cable. Therefore, the external device may be a USB memory. The sound input/output I/F 417 is a circuit that processes sound signal input and output between the microphone 418 and the speaker 419 under the control of the CPU 401. The microphone 418 is a built-in circuit that converts sound into electric signals, and acquires voice and sound waves emitted from an external speaker to acquire information using the electric signals. The speaker 419 is a built-in circuit that converts the electric signals into physical vibration, thereby generating sound such as music or voice. The bus line 420 includes an address bus and a data bus for electrically conning the components such as the CPU 401.

Functional Configuration of Information Processing System

Figure 16:
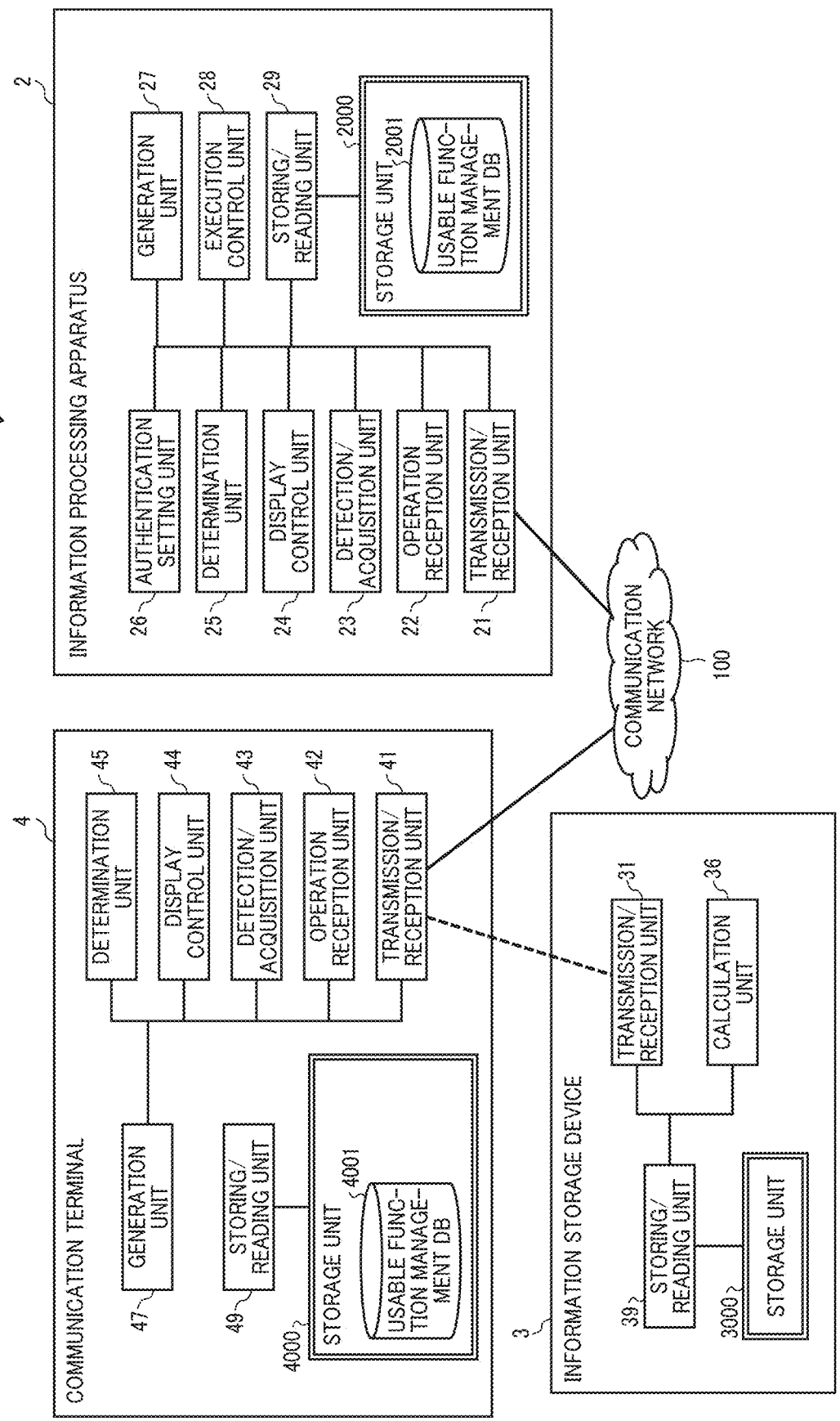
FIG. 16 is a diagram illustrating a functional configuration of the information processing system according to the second embodiment.

With reference to FIG. 16, a functional configuration of the present embodiment is described below. FIG. 16 is a diagram illustrating an example of a functional configuration of the information processing system according to the second embodiment. FIG. 16 illustrates those related to processing or operation described later out of the information processing apparatus 2 illustrated in FIG. 2, the information storage device 3 illustrated in FIG. 3, and the communication terminal 4 illustrated in FIG. 15. Since the functional configurations of the information processing apparatus 2 and the information storage device 3 and the data table are similar to those described in the first embodiment, the description thereof will be omitted.

Functional Configuration of Communication Terminal

A functional configuration of the communication terminal will be described. As illustrated in FIG. 16, the communication terminal 4 includes a transmission/reception unit 41, an operation reception unit 42, a detection/acquisition unit 43, a display control unit 44, a determination unit 45, a generation unit 47, and a storing/reading unit 49. Each of the functional units provides a function as one or more of the hardware resources illustrated in FIG. 15 operate according to instructions from the CPU 401 executing a program for the communication terminal 4, loaded into the RAM 403 from at least one of the ROM 402, the EEPROM 404, the HD 405, and the recording medium 414. The communication terminal 4 further includes a storage unit 4000 implemented by at least one of the ROM 402, the EEPROM 404, the HD 405, and the recording medium 414 illustrated in FIG. 15. The storage unit 4000 further stores a communication program (communication application) and a browser application for performing communication with the information processing apparatus 2 via the communication network 100.

Functional Configuration of Communication Terminal

The functional configuration of the communication terminal is described in detail below.

The transmission/reception unit 41 of the communication terminal 4 illustrated in FIG. 16 is implemented by, for example, processing of the CPU 401 with respect to the short-range communication I/F 408, the network I/F 411, and the external device connection I/F 416. The transmission/reception unit 41 transmits and receives various pieces of data (or information) to and from the information storage device 3 particularly via the USB interface as the external device connection I/F 416. In a case where the license information cannot be acquired, the transmission/reception unit 41 transmits a notification that execution of the process related to the predetermined function is restricted to the information processing apparatus 2. In the present embodiment, the transmission/reception unit 41 is as an example of at least one of the transmission means and the reception means.

The operation reception unit 42 is implemented by the CPU 201 processing signals generated by various operations received by at least one of the display 407, the keyboard 412, and the pointing device 413. In the present embodiment, the operation reception unit 42 is as an example of a reception means.

The detection/acquisition unit 43 is implemented by, for example, processing of the CPU 201 with respect to the external device connection I/F 416. The detection/acquisition unit 43 acquires various pieces of information such as license information indicating a license stored in the information storage device 3 connected via the external device connection I/F 416 and type information (for example, 100 ppm/110 ppm) of the information processing apparatus 2. In the present embodiment, the detection/acquisition unit 43 is as an example of an acquisition means.

The display control unit 44 is implemented by, for example, processing of the CPU 401 with respect to the display 407, and performs display control of various screens and information (data) on the communication terminal 4. In a case where the license information cannot be acquired in a state in which communication with the information processing apparatus 2 is possible, the display control unit 44 allows the display 407 to display a notification that execution of the process for predetermined function is restricted. The display control unit 44 can also display a display screen generated by HTML on the display 407 using, for example, a browser. In the present embodiment, the display control unit 44 is as an example of a display control means.

The determination unit 45 is implemented by, for example, processing of the CPU 401, and performs various determinations inside the communication terminal 4. In the present embodiment, the determination unit 45 is as an example of a determination means.

The generation unit 47 is implemented by, for example, processing of the CPU 401, and generates various pieces of information included in a print execution request to be transmitted to the information processing apparatus 2. The generation unit 47 generates various pieces of screen information to be displayed on the display 407. In the present embodiment, the generation unit 47 is as an example of a generation means.

The storing/reading unit 49 is implemented by, for example, processing performed by the CPU 401 with respect to at least one of the ROM 402, the EEPROM 404, the HD 405, and the recording medium 414, and stores or reads various pieces of data (or information) in or from the storage unit 4000. In the present embodiment, the storing/reading unit 49 is as an example of a storing/reading means.

Usable Function Management Table

In the second embodiment, a data table (usable function management DB 4001) similar to the usable function management table (usable function management DB 2001) used in the first embodiment is managed in the communication terminal 4. In other words, since a subject managing the data table merely changes from the information processing apparatus 2 to the communication terminal 4, the detailed description thereof will be omitted.

Processing or Operation of Embodiment

Processing or operation in the information processing apparatus according to the second embodiment will be described with reference to FIGS. 17 to 22.

Figure 17:
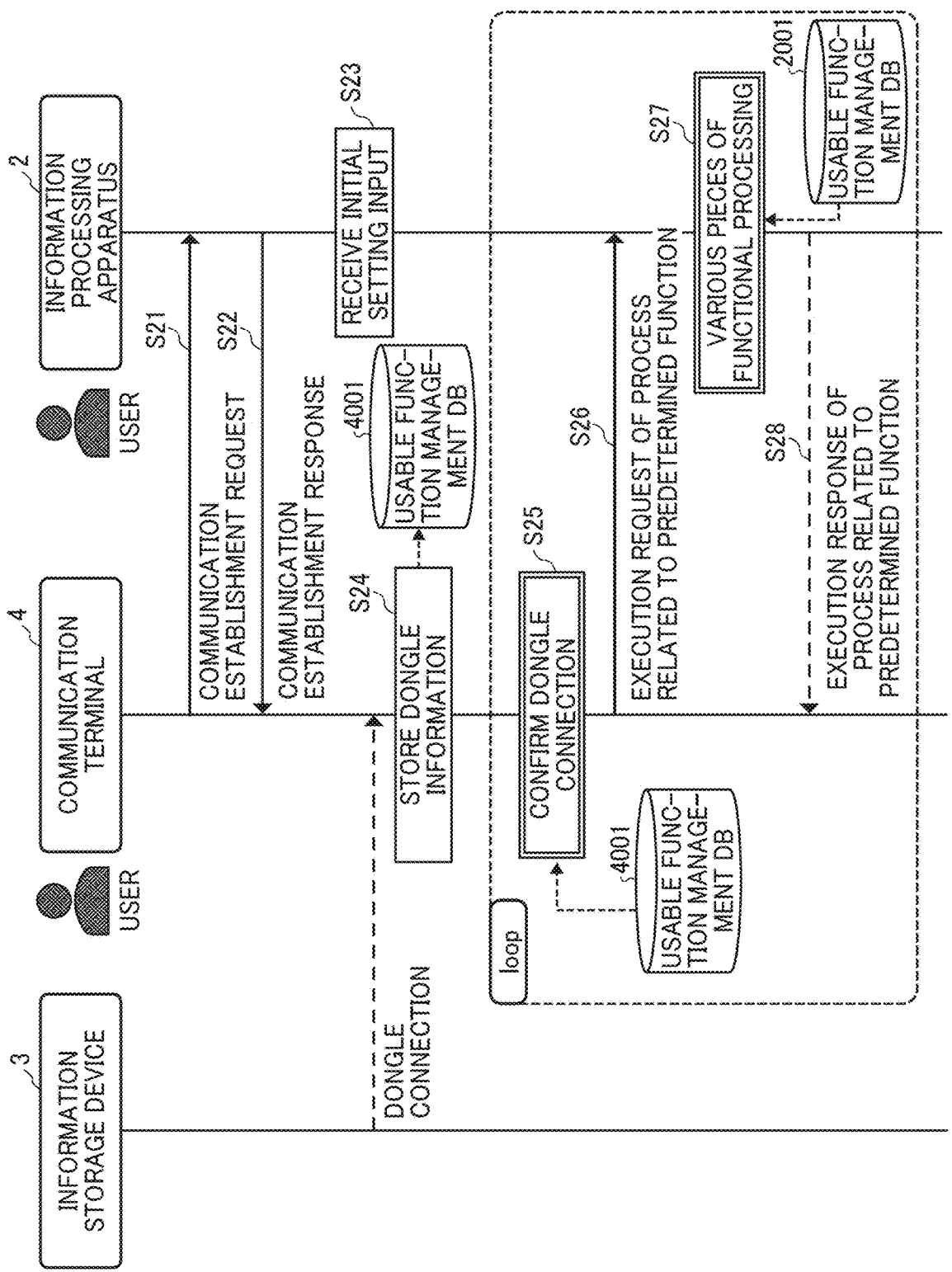
FIG. 17 is a sequence diagram including connection confirmation processing among the information storage device, the communication terminal, and the information processing apparatus according to the second embodiment.

Sequence of Processing Executed among Information Storage Device, Communication Terminal, and Information Processing Apparatus FIG. 17 is a sequence diagram including connection confirmation processing among the information storage device, the communication terminal, and the information processing apparatus according to the second embodiment.

The transmission/reception unit 41 of the communication terminal 4 first transmits a communication establishment request to the information processing apparatus 2 (step S21). As a result, the transmission/reception unit 21 of the information processing apparatus 2 receives the communication establishment request transmitted by the communication terminal 4. At that time, the communication establishment request may include a terminal ID and an internet protocol (IP) address of the communication terminal, and a session ID when communicating with the information processing apparatus 2. By executing the processing at steps S21 and S22 described above, a communication session is established in advance between the communication terminal 4 and the information processing apparatus 2, to communicate with each other.

Then, the transmission/reception unit 21 of the information processing apparatus 2 executes predetermined communication establishment processing as a response to step S21, and then transmits a communication establishment response to the communication terminal 4 (step S22). As a result, the transmission/reception unit 41 of the communication terminal 4 receives the communication establishment response transmitted by the information processing apparatus 2. The processing at steps S21 and S22 may be performed using a known technology.

Subsequently, the operation reception unit 22 of the information processing apparatus 2 receives a processing setting input by the user (step S23). This processing is similar to the processing at step S11 described in the first embodiment.

Then, the storing/reading unit 49 of the communication terminal 4 stores the information of a dongle, which is an example of the information storage device 3 (step S24). Specifically, after detecting the connection of the dongle to the external device connection I/F 416 (for example, the USB interface) of the communication terminal 4, the storing/reading unit 49 stores various piece of information acquired from the dongle in items managed by the usable functions associated with the function IDs of the usable function management DB 4001. The usable function management DB 4001 is similar to the usable function management DB 2001.

Then, the various functional units of the communication terminal 4 execute dongle connection confirmation (step S25). At that time, the communication terminal 4 may read various pieces of information stored in the usable function management DB 4001 for performing the processing.

Details of Dongle Connection Confirmation

Figure 18:
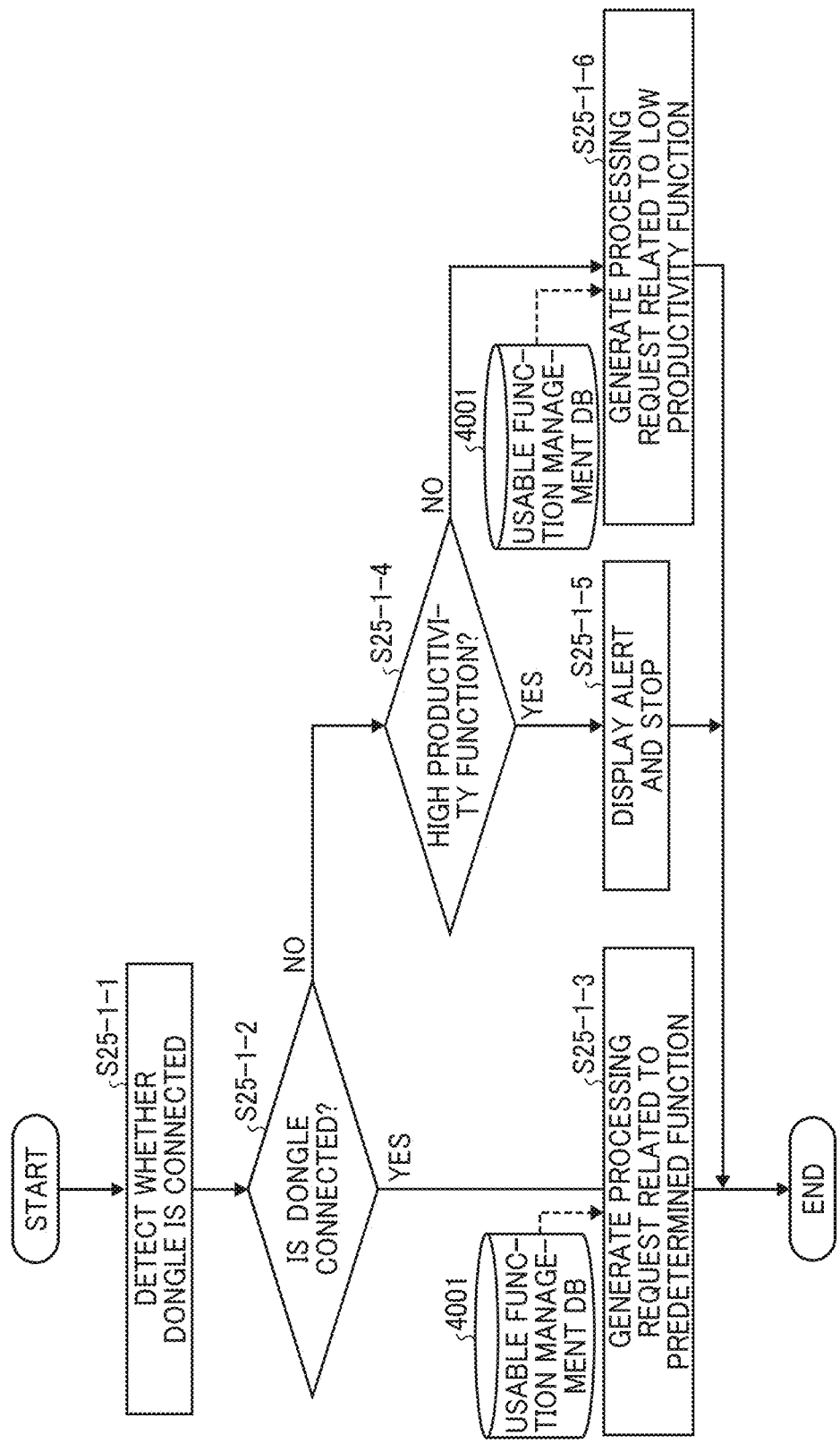
FIG. 18 is a flowchart illustrating connection confirmation processing of the information storage device according to the second embodiment.

Then, details of the dongle connection confirmation will be described. FIG. 18 is a flowchart illustrating a connection confirmation process of the information storage device according to the second embodiment. The flowchart illustrated in FIG. 18 is an example, and processing according to embodiments of the present disclosure is not limited thereto.

First, the detection/acquisition unit 43 of the communication terminal 4 detects whether the dongle (the information storage device 3) is connected at the time of power-on or activation of the communication terminal 4 or during operation of the information processing apparatus 2 (step S25-1-1). Specifically, the detection/acquisition unit 43 detects whether the dongle is connected to the external device connection I/F 416 (USB interface).

Then, the determination unit 45 determines whether the dongle is connected (step S25-1-2). For example, the determination unit 45 may acquire a signal from the detection/acquisition unit 43 by polling using a clock of the CPU 401 in the communication terminal 4, and determine the connection of the dongle on the basis of the signal.

In a case where it is determined that the dongle is connected (step S25-1-2: YES), the generation unit 47 generates a request for the process related to the predetermined function (step S25-1-3). Specifically, the generation unit 47 generates a request for the process related to the predetermined function with reference to the usable functions associated with the function IDs stored in the usable function management DB 4001 on the basis of the license information acquired by connection of the dongle.

By contrast, in a case where no dongle is connected at the time of power-on or activation of the communication terminal 4 or during the operation of the information processing apparatus 2, i.e., in a case of step S25-1-2: NO, the determination unit 25 further determines whether the information processing apparatus 2 is in a state or setting of executing the high productivity function (step S25-1-4). In a case where the information processing apparatus 2 is in a state or setting of executing the high productivity function (step S25-1-4: YES), the display control unit 24 displays an alert (step S25-1-5) and exits this flow. Specifically, the display control unit 44 allows the display 407 to display a warning screen as illustrated in FIG. 21 to stop the processing, and exits this flow.

Screen Display Example

A display screen example in the communication terminal 4 will be described.

Figure 21:
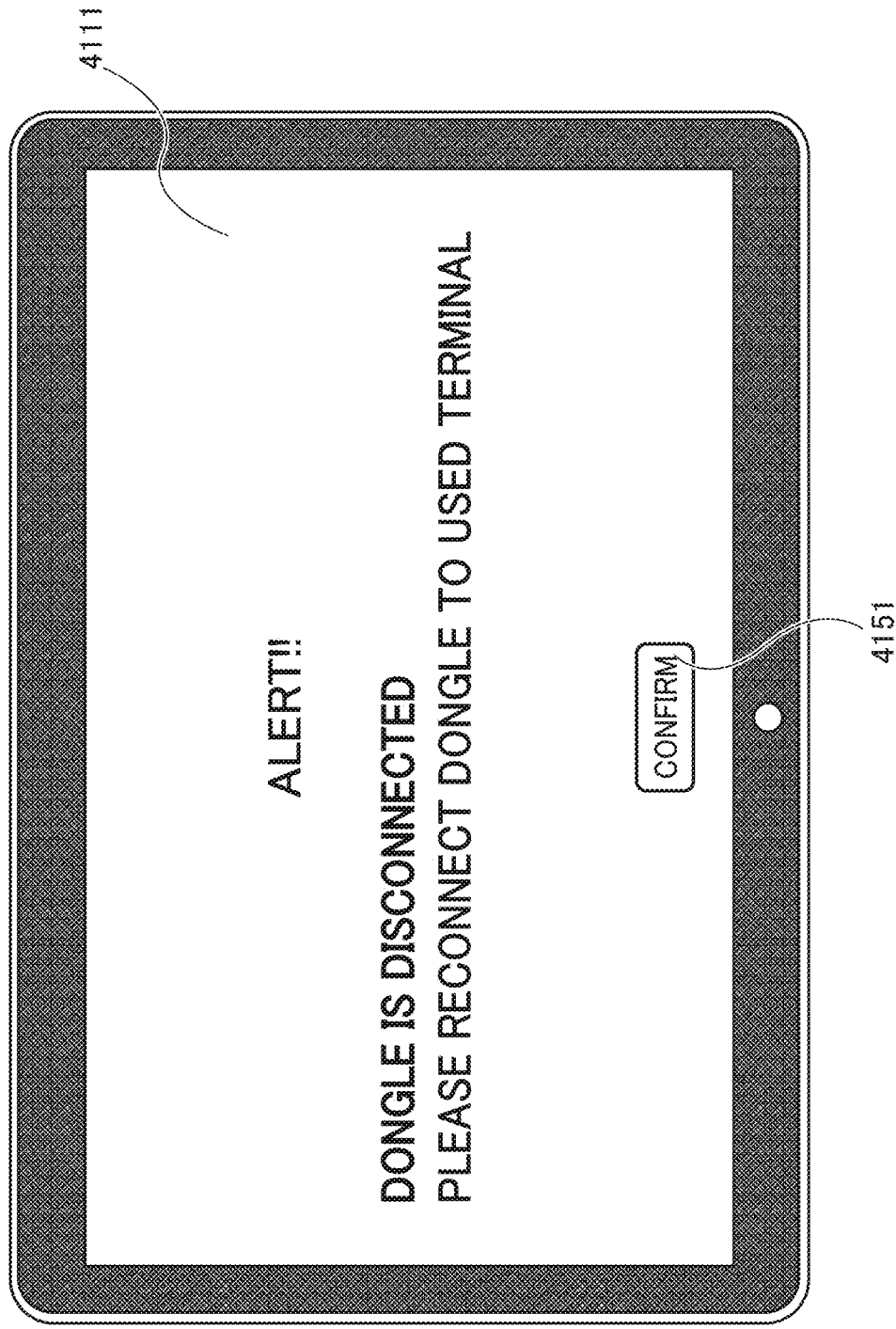
FIG. 21 is a diagram illustrating an alert display screen in the communication terminal according to the second embodiment.

FIG. 21 is a diagram illustrating an example of an alert display screen in the communication terminal according to the second embodiment. As illustrated in FIG. 21, a warning screen 4111 is displayed on the display 407 of the communication terminal 4 by the display control unit 44. On the warning screen 4111, a message indicating that the dongle is disconnected and a message prompting reconnection of the dongle are displayed. A confirmation button 4151 is further displayed on the warning screen 4111.

The communication terminal 4 may allow the user to operate the confirmation button 4151 to receive reconnection of the dongle.

Referring back to FIG. 16, in a case where the information processing apparatus 2 is not in a state or setting of executing the high productivity function (step S25-1-4: NO), the generation unit 47 generates a request for the process related to the low productivity function (step S25-1-6) and exits this flow.

The low productivity function at that time refers to a function other than the function executable only under a predetermined license acquired from the connected dongle. These functions are not particularly limited as long as they are, for example, functions set by the user and functions that do not require the dongle connection managed by the usable function management DB 4001.

As a result, it is possible to prevent a function of predetermined productivity protected according to the license or more from being inadvertently released as in the first embodiment.

Other Details of Dongle Connection Confirmation

Other details of the dongle connection confirmation will be described.

Figure 19:
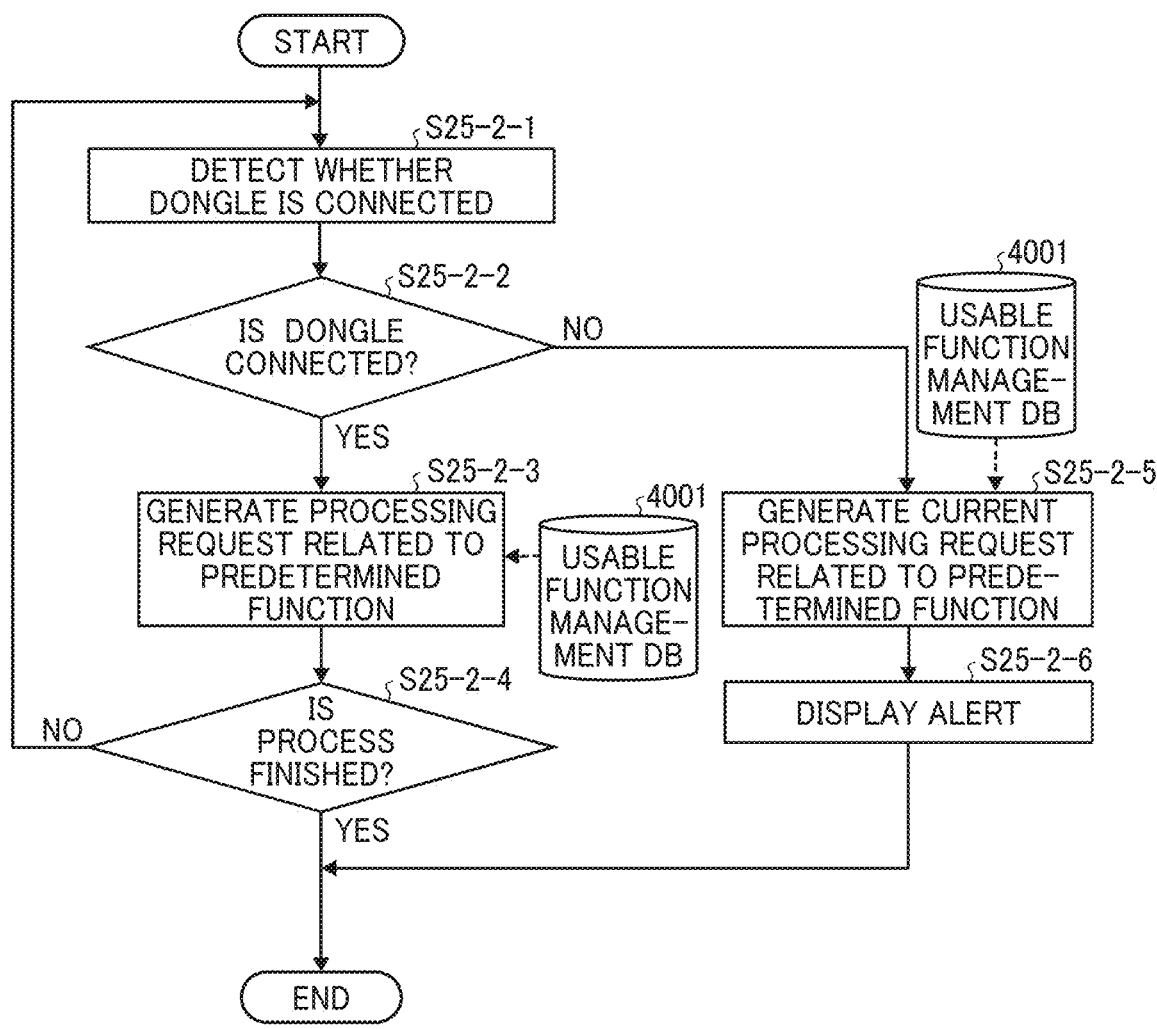
FIG. 19 is a flowchart illustrating another connection confirmation processing of the information storage device according to the second embodiment.

FIG. 19 is a flowchart illustrating another example of the connection confirmation processing of the information storage device according to the second embodiment. The flowchart illustrated in FIG. 19 is an example, and the processing according to embodiments of the present disclosure is not limited thereto.

First, the detection/acquisition unit 43 of the communication terminal 4 detects whether the dongle is connected to the communication terminal 4 in a state in which the communication is established between the communication terminal 4 and the information processing apparatus 2 (after the processing at steps S21 and S22) (step S25-2-1). Specifically, after the communication between the communication terminal 4 and the information processing apparatus 2 is established, the detection/acquisition unit 43 detects whether the dongle is connected to the external device connection I/F 416 (USB interface).

In a case where it is determined that the dongle is connected (step S25-2-2: YES), the generation unit 47 generates a request for the process related to the predetermined function (step S25-2-3). Specifically, the generation unit 47 generates a request for the process related to the predetermined function with reference to the usable functions associated with the function IDs stored in the usable function management DB 4001 on the basis of the license information acquired by connection of the dongle.

Subsequently, the determination unit 45 determines whether the processing is finished (step S25-2-4). The determination unit 45 acquires, for example, a print execution response signal from the information processing apparatus 2 to grasp the finish of a predetermined function of the information processing apparatus 2, and determines whether the process is finished.

In a case where the processing is finished (step S25-2-4: YES), the determination unit 45 exits this flow. By contrast, in a case where the processing is not finished (step S25-2-4: NO), the determination unit 45 returns to the processing at step S25-2-1.

In a case where it is determined that no dongle is connected in the determination processing at step S25-2-2 (step S25-2-2: NO), the generation unit 47 generates a request for the current process related to a predetermined function (step S25-2-5). Although, at step S25-2-5, the generation unit 47 generates a request for the process related to the predetermined function similar to that at step S25-2-3, the generation unit 47 generates a request for only the process currently executed or executable by the information processing apparatus 2 among the requests for processes. After the execution of the processing in the information processing apparatus 2 based on the processing request, a request for stopping (canceling) subsequent processing is generated. The generation unit 47 further generates a request that disables the use in the maintenance mode (for example, the service mode) executable on the seller side in the information processing apparatus 2.

As a result, prevention of unauthorized use is enhanced.

After generating the processing request at present, the display control unit 44 displays an alert and exits this flow (step S13-2-6). The display of this alert is similar to the processing content at step S25-1-5 described above.

Other Details of Dongle Connection Confirmation

Then, other details of the dongle connection confirmation will be described.

Figure 20:
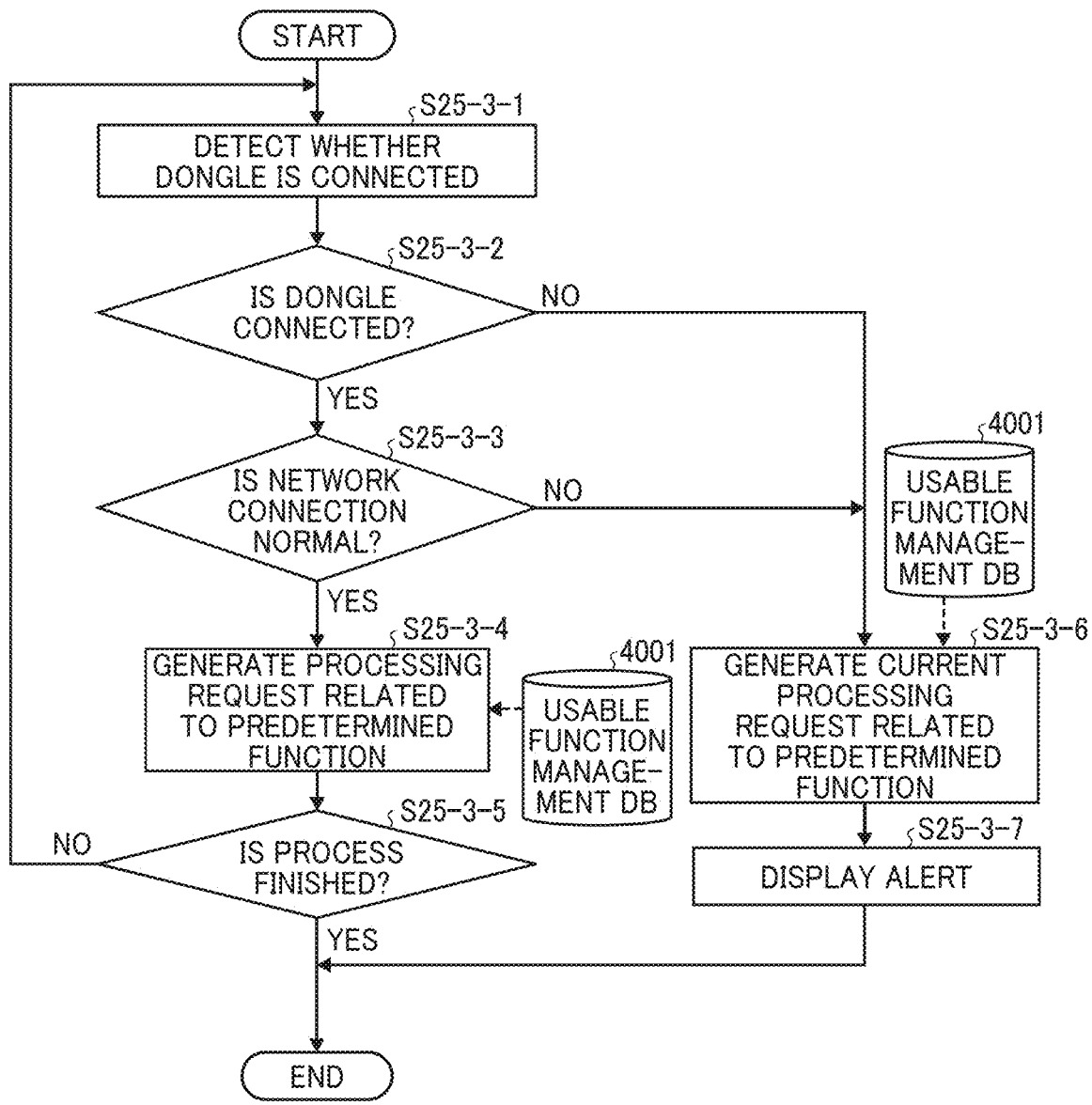
FIG. 20 is a flowchart illustrating another connection confirmation processing of the information storage device according to the second embodiment.

FIG. 20 is a flowchart illustrating another example of the connection confirmation processing of the information storage device according to the second embodiment. The flowchart illustrated in FIG. 20 is an example, and the processing according to embodiments of the present disclosure is not limited thereto. In FIG. 20, a determination as to whether the communication terminal 4 and the information processing apparatus 2 are normally connected to each other via a network is added. The processing will be described below.

Since the processing at steps S25-3-1 and S25-3-2 is similar to the processing at steps S25-1-1 and S25-1-2 described above, the description thereof is omitted.

Subsequently, the determination unit 45 of the communication terminal 4 determines whether the network connection is normal (step S25-3-3). Specifically, the determination unit 45 confirms the network connection state connected to the network I/F 411 via the detection/acquisition unit 23, and confirms whether the connection to the information processing apparatus 2 via the communication network 100 is normal. Note that, the communication terminal 4 may be connected to the information processing apparatus 2 by a wired cable such as a USB cable instead of the communication network 100.

In a case where the network connection is normal (step S25-3-3: YES), the generation unit 47 generates a request for the process related to the predetermined function (step S25-3-4). The details of the processing at step S25-3-4, step S25-3-6, and step S25-3-7 are similar to those at step S25-2-4, step S25-2-5, and step S25-2-6 described above, so that description thereof is omitted below.

Referring back to FIG. 17, the transmission/reception unit 21 of the communication terminal 4 transmits an execution request for the process related to the predetermined function to the information processing apparatus 2 (step S26). As a result, the transmission/reception unit 21 of the information processing apparatus 2 receives the execution request for the process related to predetermined function transmitted by the communication terminal 4. At that time, the execution request for the process related to the predetermined function includes an execution request (instruction) that can be processed according to a confirmation result in the dongle connection confirmation, and various pieces of data (information) for executing the corresponding process.

Then, the execution control unit 28 of the information processing apparatus 2 executes various processing (step S27). Specifically, the execution control unit 28 restricts the execution of the process related to the predetermined function in the information processing apparatus 2 on the basis of the execution instruction included in the execution request of the process related to the predetermined function received at step S26, and various pieces of data (information) for executing the corresponding process.

Processing of Dongle Connection Confirmation Processing in Information Processing Apparatus Details of the dongle connection confirmation processing from the viewpoint of the information processing apparatus 2 will be described.

Figure 22:
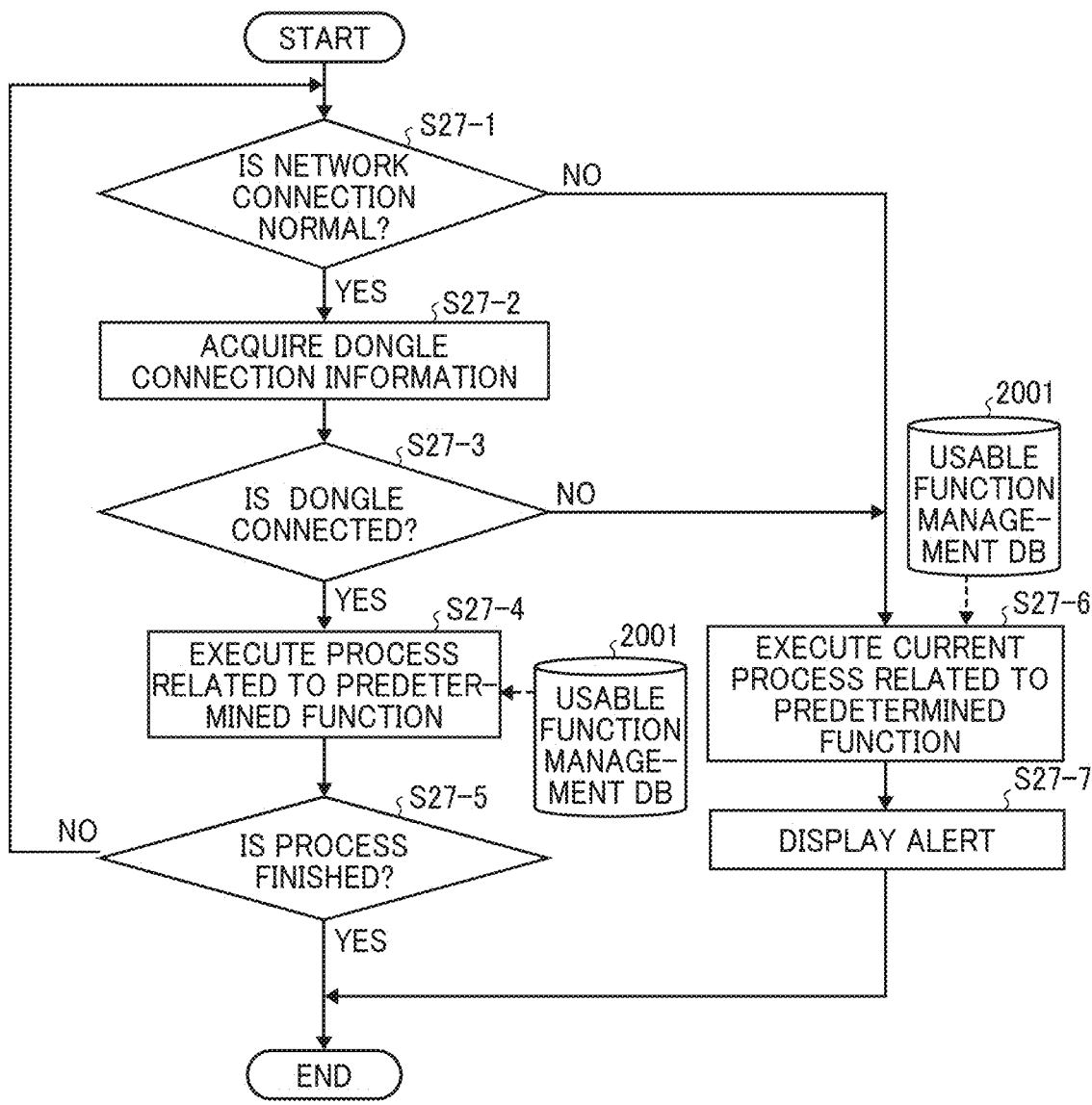
FIG. 22 is a flowchart illustrating connection confirmation processing of the information storage device according to the second embodiment.

FIG. 22 is a flowchart illustrating an example of connection confirmation processing of the information storage device according to the second embodiment. The flowchart illustrated in FIG. 22 is an example, and the present invention is not limited thereto.

First, the determination unit 25 of the information processing apparatus 2 determines whether the network connection is normal (step S27-1). Specifically, for example, the determination unit 25 confirms the network connection state by communication with the communication terminal 4 via the transmission/reception unit 21, and confirms whether the connection to the communication terminal 4 via the communication network 100 is normal.

In a case of determining that the network connection is not normal (step S27-1: NO), the determination unit 25 transits to the processing at step S27-6 described later.

By contrast, in a case where it is determined that the network connection is normal (step S27-1: YES), the detection/acquisition unit 23 acquires the dongle connection information (step S27-2). Specifically, as at step S27-1, the detection/acquisition unit 23 acquires the dongle connection information included in the information acquired when communication with the communication terminal 4 is performed via the transmission/reception unit 21. The information processing apparatus 2 may allocate a specific flag in the data in the communication with the communication terminal 4 as a dongle connection state flag and acquire the state of the flag.

Then, the determination unit 25 determines whether the dongle is connected (step S27-3). Specifically, the determination unit 25 determines whether the dongle is connected on the basis of the content of the dongle connection state flag acquired at step S27-2.

In a case where the dongle is connected (step S27-3: YES), the execution control unit 28 executes the process related to the predetermined function (e.g., print job transmitted from the communication terminal 4) (step S27-4). Specifically, the execution control unit 28 executes the process (e.g., print job) related to the predetermined function (e.g., printing) with reference to the usable functions associated with the function IDs stored in the usable function management DB 2001 (refer to FIG. 5) on the basis of the license information acquired by the connection of the dongle.

Then, the determination unit 25 determines whether the processing (print job) is finished (step S27-5). In a case where the processing is not finished (step S27-5: NO), the determination unit 25 returns to the processing at step S27-1, and in a case where the printing is finished (step S27-5: YES), the determination unit 25 exits this flow.

By contrast, in a case where it is determined that no dongle is connected (step S27-3: NO), the execution control unit 28 executes the current process related to the predetermined function (step S27-6). Note that, at step S27-6, the execution control unit 28 executes the process related to the predetermined function similar to that at step S27-4, but executes only the process currently executed by the information processing apparatus 2 among the processing (at present). After the current processing is executed, the execution control unit 28 stops (cancels) the subsequent processing. In the information processing apparatus 2, the execution control unit 28 further imposes a certain restriction on the execution of the process for the scan function and the copy function that can be operated by the apparatus alone. As a result, in a case where the dongle connection state on the communication terminal 4 side cannot be detected, it is possible to prevent in advance the subsequent unauthorized use in the information processing apparatus 2.

Subsequently, after the processing at present is executed, the display control unit 24 displays an alert on the panel display 240a and exits this flow (step S27-7). The above-described processing executed at step S27-7 is for preventing in advance an unauthorized use when it is determined that the dongle is not connected as described above. This is for avoiding a paper jam due to interruption of a process related to the predetermined function in the information processing apparatus 2 such as the MFP.

Referring back to FIG. 17 again, the transmission/reception unit 21 of the information processing apparatus 2 transmits an execution response of the process related to the predetermined function to the communication terminal 4 as a response to the execution request of the process related to the predetermined function at step S26 (step S28). As a result, the transmission/reception unit 41 of the communication terminal 4 receives the execution response of the process related to the predetermined function transmitted by the information processing apparatus 2. The processing at step S28 may be omitted.

In the present embodiment, the processing at steps S25 to S28 described above is repeatedly performed until the process related to a predetermined function in the information processing apparatus 2 is completed (execution of loop processing).

In the information processing system according to the present embodiment, for example, in a case where the operations at steps S21 to S22 and steps S26 and S28 described above are executed via the communication network 100, another device may be present between the communication terminal 4 and the information processing apparatus 2. In other words, various pieces of information (or data) may be transmitted/received between the communication terminal 4 and the information processing apparatus 2 via another device.

The above-described configuration is applicable also in a case where there is another processing step between the communication terminal 4 and the information processing apparatus 2. Note that, the sequence diagram illustrated in FIG. 17 is an example, and the present invention is not limited thereto.

In the second embodiment, in the information processing system 1, in a case where a dongle similar to the dongle connected to the communication terminal 4 is connected on the information processing apparatus 2 side, the connection state may be detected on the communication terminal 4 side, and the system may be preferentially controlled by a license based on the dongle connected to the communication terminal 4. A predetermined notification (alert) may be displayed on the communication terminal 4 and the information processing apparatus 2 as necessary. As a result, the communication terminal 4 can control whether process related to the predetermined function executed in the information processing apparatus 2 can be performed.

As a result, the user who uses the communication terminal 4 can also prevent in advance a possibility that the unauthorized function is performed in the information processing apparatus 2 at the timing when a similar dongle is connected to the information processing apparatus 2 even in a place physically away from the information processing apparatus 2.

As described above, according to the present embodiment, the communication terminal 4 acquires the license information indicating the license (step S25-2-1), and generates the request for process related to a predetermined function when, for example, the state of acquisition of the license information changes to a state of not acquired (steps S25-1-3 and S25-1-5). As a result, similar to the effect provided by the first embodiment, even in a case where there is a change in the acquisition state of the license information enabling the execution of the processing during the execution of the process related to the predetermined function, the processing according to the change can be performed.

Supplement to Embodiments

Each of the functions according to the described embodiment can be implemented by one or more processing circuitry. The "processing circuitry" in the present specification includes a device programmed to execute each function by software, such as a processor implemented by an electronic circuit. The device is, for example, a processor, an application-specific integrated circuit (ASIC) designed to execute the functions described above, a digital signal processor (DSP), a field programmable gate array (FPGA), a system on a chip (SOC), a graphics processing unit (GPU), or a conventional circuit module.

In the above-described embodiment, the information processing apparatus 2 and the communication terminal 4 may construct a system to execute various determinations by machine learning, i.e., learning using artificial intelligence (AI). For example, the information processing apparatus 2 and the communication terminal 4 may extract and execute a function that may process the processing of the information processing apparatus 2 and the communication terminal 4 based on the result of the dongle connection confirmation by using an analysis method using machine learning.

Although the information processing apparatus, the information processing system, the method for processing information, and the program according to the embodiments of the present disclosure have been described above, the embodiments of the present disclosure are not limited to the above-described embodiments, and it is possible to change within the scope conceived of by one skilled in the art such as addition, change, or deletion of another embodiment, and any aspect is included in the scope of the present disclosure as long as the action and effect of the present disclosure are obtained.

Aspects according to the present disclosure are, for example, as follows.

Aspect 1

An information processing apparatus 2 (an example of an information processing apparatus) according to a first aspect includes a detection/acquisition unit 23 (an example of an acquisition unit) and an execution control unit 28 (an example of a control unit). The detection/acquisition unit 23 executes process related to a predetermined function permitted by a license and acquires license information indicating the license. The execution control unit 28 restricts execution of the process related to the predetermined function in a case where the state of the license information being acquired by the detection/acquisition unit 23 changes to the state of not acquired during the execution of the process related to the predetermined function.

According to the first aspect, even when the acquisition state of the license information enabling the predetermined function changes during the execution of a process related to the predetermined function, a process according to the change can be performed.

Aspect 2

In a second aspect, the detection/acquisition unit 23 of the information processing apparatus 2 of the first aspect acquires the license information from an information storage device 3 (an example of an information storage device) that is connectable to the information processing apparatus 2 and stores the license in a state in which the information storage device 3 information is connected to the information processing apparatus 2.

According to the second aspect, processing according to the acquired license information becomes possible.

Aspect 3

In a third aspect, in the information processing apparatus 2 of the first or second aspect, in a case where the acquisition state of the license information changes to the state of the license information not acquirable during the use of the predetermined function, the execution control unit 28 stops a subsequent process related to the predetermined function after completion of the current process as restriction of the predetermined function.

According to the third aspect, an unauthorized use of a function can be prevented in advance.

Aspect 4

In a fourth aspect, the execution control unit 28 of the information processing apparatus 2 of the first or second aspect executes the process related to a function having lower productivity than a function executed in the state of the license information being acquired in a case where the state changes to the state of the license information not acquired during the use of the predetermined function.

According to the fourth aspect, the unauthorized use of the function can be prevented in advance.

Aspect 5

In a fifth aspect, the execution control unit 28 of the information processing apparatus 2 of any one of the first to fourth aspects executes, as the predetermined function, process related to a function with higher productivity than process related to a function executed in the state of the license information not acquired in a case where the state of the license information being acquired is maintained during the use of the predetermined function.

According to the fifth aspect, it is possible to execute processing of guaranteeing the acquired license information.

Aspect 6

In a sixth aspect, in the information processing apparatus 2 of any one of the first to fifth aspects, the state in which the license information is acquirable is a state in which the information processing apparatus 2 is powered on and the information storage device 3 is connected to the information processing apparatus 2.

According to the sixth aspect, it is possible to execute the processing of guaranteeing the acquired license information.

Aspect 7

In a seventh aspect, in the information processing apparatus 2 of any one of the first to fifth aspects, the state in which the license information is acquirable is a state in which the information storage device 3 is connected to the information processing apparatus 2 and a state in which activation processing for enabling the execution of the process related to the predetermined function is already executed.

According to the seventh aspect, the unauthorized use of the function can be prevented in advance.

Aspect 8

According to an eighth aspect, the information processing apparatus 2 of the third aspect includes a display control unit 24 (an example of a display control unit) that causes a panel display 240*a* (an example of a display) to display a notification that the process for the predetermined function is stopped in accordance with the stop of the subsequent process.

According to the eighth aspect, it is possible to appropriately notify a user of an acquisition status of the license information.

Aspect 9

According to a ninth aspect, the information processing apparatus 2 of the eighth aspect further includes a determination unit 25 (an example of a determination unit) that determines whether to perform the notification by the display control unit 24 or to execute a process for a function with low productivity according to function information stored in the information processing apparatus 2 in a case where the information processing apparatus 2 is powered without a connection with the information storage device 3 storing the license information.

According to the ninth aspect, it is possible to perform flexible processing on the function based on the license information.

Aspect 10

An information processing system 1 (an example of an information processing system) according to a tenth aspect includes an information processing apparatus 2 (an example of an information processing apparatus) that executes a process related to a predetermined function permitted by a license, and a communication terminal 4 (an example of a communication terminal) that communicates with the information processing apparatus 2. The communication terminal 4 includes a detection/acquisition unit 43 (an example of an acquisition unit) that acquires license information indicating the license, a display control unit 44 (an example of a display control unit) that causes, in a case where the communication terminal 4 communicates with the information processing apparatus 2 but the license information is not acquired, a display 407 (an example of a display) to display a notification including that execution of the process related to the predetermined function is restricted, and a transmission/reception unit 41 (an example of a transmission unit) that transmits the notification to the information processing apparatus 2, and the information processing apparatus 2 includes a transmission/reception unit 21 (an example of a reception unit) that receives the notification transmitted by the communication terminal 4, and an execution control unit 28 (an example of a control unit) that restricts the execution of the process related to the predetermined function in a case where the notification is received by the transmission/reception unit 21 during the execution of the process related to the predetermined function.

According to the tenth aspect, as in the first aspect, even in a case where there is a change in the acquisition state of the license information permitting the predetermined function during the execution of the process related to the predetermined function, a process according to the change can be performed.

Aspect 11

According to an eleventh aspect, a method for processing information executed by an information processing apparatus 2 (an example of an information processing apparatus) includes acquiring license information indicating a license, and restricting execution of a process related to a predetermined function in a case where a state of acquisition of the license information changes to a state of not acquired during the execution of the process related to the predetermined function.

According to the eleventh aspect, as in the first aspect, even in a case where there is a change in the acquisition state of the license information permitting the predetermined function during the execution of the process related to the predetermined function, a process according to the change can be performed.

Aspect 12

A twelfth aspect concerns a program that causes an information processing apparatus 2 (an example of an information processing apparatus) to execute a method. The method includes acquiring license information indicating a license, and restricting execution of a process related to a predetermined function in a case where a state of acquisition of the license information changes to a state of not acquired during the execution of the process related to the predetermined function.

According to the twelfth aspect, as in the first aspect, even in a case where there is a change in the acquisition state of the license information enabling the execution of the processing during the execution of the process related to the predetermined function, the processing according to the change can be performed.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general-purpose processors, special-purpose processors, integrated circuits, application-specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An information processing apparatus comprising
processing circuitry configured to:
acquire license information indicating a license of a predetermined function; execute a process related to the predetermined function permitted by the license; and
in a case where a state of the license information being acquired changes to a state of not acquired during execution of the process, restrict the execution of the process related to the predetermined function,
wherein the state of the license information being acquired is a state in which a memory storing the license information is connected to the information processing apparatus and activation for enabling execution of the process related to the predetermined function is already executed.

2. The information processing apparatus according to claim 1,
wherein the process related to the predetermined function includes multiple processes including a current process being executed and a subsequent process, and
wherein, in a case where the state of the license information being acquired changes to the state of the license information not acquired during execution of the predetermined function, the processing circuitry is configured to stop execution of the subsequent process after completion of the current process.

3. The information processing apparatus according to claim 2,
wherein the processing circuitry is configured to cause a display to display a notification indicating that the process related to the predetermined function is stopped in accordance with stop of the subsequent process.

4. The information processing apparatus according to claim 1,
wherein, in a case where the state of the license information being acquired changes to the state of the license information not acquired during execution of the predetermined function permitted by the license, the processing circuitry is configured to execute a process related to a function having lower productivity than the predetermined function.

5. The information processing apparatus according to claim 1,
wherein, in a case where the state of the license information being acquired is maintained during execution of the predetermined function, the processing circuitry is configured to execute a process related to the predetermined function having higher productivity than a function to be executed when the license information is not acquired.

6. An information processing apparatus, comprising:
processing circuitry configured to:
acquire license information indicating a license of a predetermined function; execute a process related to the predetermined function permitted by the license; and
in a case where a state of the license information being acquired changes to a state of not acquired during execution of the process, restrict the execution of the process related to the predetermined function,
wherein the process related to the predetermined function includes multiple processes including a current process being executed and a subsequent process, and
wherein, in a case where the state of the license information being acquired changes to the state of the license information not acquired during execution of the predetermined function, the processing circuitry is configured to stop execution of the subsequent process after completion of the current process,
wherein the processing circuitry is configured to cause a display to display a notification indicating that the process related to the predetermined function is stopped in accordance with stop of the subsequent process, and
wherein, in a case where the information processing apparatus is powered on without a connection with a memory storing the license information, the processing circuitry is configured to determine whether to cause the display to display the notification or to execute a process related to a low-productivity function based on function information stored in the information processing apparatus, the low-productivity function having lower productivity than the predetermined function permitted by the license.

7. An information processing system, comprising:
the information processing apparatus according to claim 1; and
a communication terminal,
the communication terminal including first processing circuitry configured to:
acquire license information indicating a license of a predetermined function;
in a case that communication with the information processing apparatus is established and the license information is not acquired, cause a display to display a notification indicating that execution of a process related to the predetermined function is restricted;
transmit the notification via a network to the information processing apparatus; and
wherein the case where a state of the license information being acquired changes to a state of not acquired during execution of the process includes receiving the notification from the communication terminal.

8. A non-transitory recording medium storing a plurality of program codes which, when executed by one or more processors, causes the one or more processors to perform a method, the method comprising:

acquiring license information indicating a license of a predetermined function;

executing a process related to the predetermined function permitted by the license; and in a case where a state of the license information being acquired changes to a state of not acquired during execution of the process, restricting the execution of the process related to the predetermined function, wherein the state of the license information being acquired is a state in which a memory storing the license information is connected to an information processing apparatus and activation for enabling execution of the process related to the predetermined function is already executed.

* * * * *